US011459812B2

(12) United States Patent
Kato

(10) Patent No.: US 11,459,812 B2
(45) Date of Patent: Oct. 4, 2022

(54) DAMPER

(71) Applicant: PIOLAX, INC., Kanagawa (JP)

(72) Inventor: Kouichi Kato, Kanagawa (JP)

(73) Assignee: PIOLAX, INC., Kanagawa (JP)

(*) Notice: Subject to any disclaimer, the term of this patent is extended or adjusted under 35 U.S.C. 154(b) by 274 days.

(21) Appl. No.: 16/980,585

(22) PCT Filed: Mar. 22, 2019

(86) PCT No.: PCT/JP2019/012150
§ 371 (c)(1),
(2) Date: Sep. 14, 2020

(87) PCT Pub. No.: WO2019/188807
PCT Pub. Date: Oct. 3, 2019

(65) Prior Publication Data
US 2021/0062564 A1 Mar. 4, 2021

(30) Foreign Application Priority Data

Mar. 28, 2018 (JP) .............................. JP2018-061798
Mar. 28, 2018 (JP) .............................. JP2018-061919
Mar. 28, 2018 (JP) .............................. JP2018-062909

(51) Int. Cl.
*F16F 9/02* (2006.01)
*E05F 3/12* (2006.01)
(Continued)

(52) U.S. Cl.
CPC .............. *E05F 3/12* (2013.01); *F16F 9/0218* (2013.01); *F16F 9/3214* (2013.01);
(Continued)

(58) Field of Classification Search
CPC ...... F16F 9/0218; F16F 9/3214; F16F 9/3221; F16F 9/516; F16F 2222/126;
(Continued)

(56) References Cited

U.S. PATENT DOCUMENTS

| 4,110,868 A | 9/1978 | Imazaike |
| 5,535,861 A | 7/1996 | Young |

(Continued)

FOREIGN PATENT DOCUMENTS

| AT | 412184 B | 11/2004 |
| CN | 101675266 A | 3/2010 |

(Continued)

OTHER PUBLICATIONS

Mar. 22, 2019, International Preliminary Report on Patentability issued for related PCT application No. PCT/JP2019/012150.

(Continued)

*Primary Examiner* — Xuan Lan Nguyen
(74) *Attorney, Agent, or Firm* — Paratus Law Group, PLLC

(57) ABSTRACT

A damper includes a cylinder, a rod including a first engaging portion at a tip end thereof, and a piston formed of an elastic resin material. The piston includes a convex portion provided so as to protrude at a base end portion located on a rod base end side and always in pressure contact with an inner circumference of the cylinder. During damper braking, the first engaging portion of the rod abuts against the other end portion of the piston, and an axial compression force acts on the piston between the first engaging portion and the convex portion in pressure contact with the inner circumference of the cylinder.

20 Claims, 41 Drawing Sheets

(51) Int. Cl.
*F16F 9/32* (2006.01)
*F16F 9/516* (2006.01)

(52) U.S. Cl.
CPC ............ *F16F 9/3221* (2013.01); *F16F 9/516* (2013.01); *E05Y 2201/212* (2013.01); *E05Y 2201/234* (2013.01); *E05Y 2900/538* (2013.01); *F16F 2222/126* (2013.01); *F16F 2224/025* (2013.01); *F16F 2232/08* (2013.01); *F16F 2234/02* (2013.01)

(58) Field of Classification Search
CPC ............ F16F 2224/025; F16F 2232/08; F16F 2234/02; E05F 3/12
See application file for complete search history.

(56) References Cited

U.S. PATENT DOCUMENTS

| | | | |
|---|---|---|---|
| 5,613,580 A | 3/1997 | Young | |
| 8,348,028 B2 | 1/2013 | Zimmer et al. | |
| 9,127,493 B2 * | 9/2015 | Zimmer | F16F 9/368 |
| 2003/0075845 A1 | 4/2003 | Krammer | |
| 2009/0084645 A1 | 4/2009 | Okabayashi | |
| 2010/0253101 A1 | 10/2010 | Seto et al. | |
| 2011/0209954 A1 | 9/2011 | Sakai et al. | |
| 2011/0214953 A1 | 9/2011 | Maeda et al. | |
| 2012/0037469 A1 * | 2/2012 | Juan | F16F 9/0218 188/271 |
| 2012/0091641 A1 | 4/2012 | Yang | |
| 2012/0175830 A1 | 7/2012 | Yang | |
| 2014/0231201 A1 | 8/2014 | Maeda et al. | |
| 2016/0215552 A1 | 7/2016 | Löhken et al. | |
| 2017/0002886 A1 | 1/2017 | Tomita | |
| 2018/0135719 A1 * | 5/2018 | Inoue | F16F 9/362 |

FOREIGN PATENT DOCUMENTS

| | | | |
|---|---|---|---|
| CN | 101836009 A | 9/2010 | |
| CN | 102216643 A | 10/2011 | |
| CN | 107532673 A | 1/2018 | |
| DE | 20219411 U1 * | 10/2003 | ........... A47B 88/047 |
| DE | 202009005757 U1 | 7/2009 | |
| DE | 102015201474 A1 | 7/2016 | |
| JP | S52-111894 U | 8/1977 | |
| JP | H11-511229 A | 9/1999 | |
| JP | 2011-202800 A | 10/2011 | |
| KR | 1776472 B1 * | 9/2017 | ........... F16F 9/0218 |
| TW | M362318 U1 | 8/2009 | |
| WO | WO 2007/143760 A1 | 12/2007 | |
| WO | WO 2015/093548 A1 | 6/2015 | |

OTHER PUBLICATIONS

Apr. 23, 2019, International Search Report for related PCT application No. PCT/JP2019/012150.
Apr. 23, 2019, International Search Opinion for related PCT application No. PCT/JP2019/012150.
Mar. 17, 2020, International Written Opinion issued for related PCT application No. PCT/JP2019/012150.
Jul. 3, 2020, International Preliminary Report on Patentability issued for related PCT application No. PCT/JP2019/012150.
Jan. 7, 2022, Chinese Office Action issued for related CN Application No. 201980022808.0.

* cited by examiner

Fig. 3
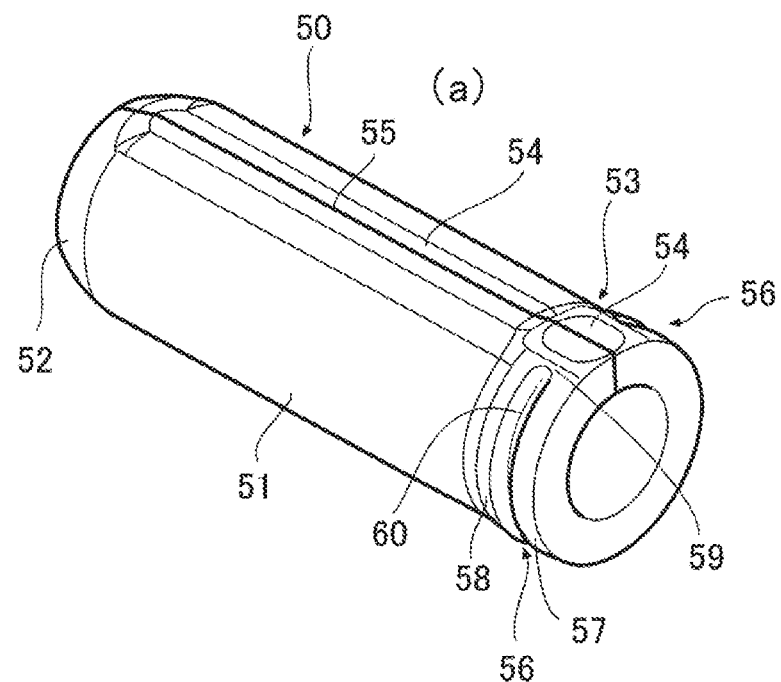
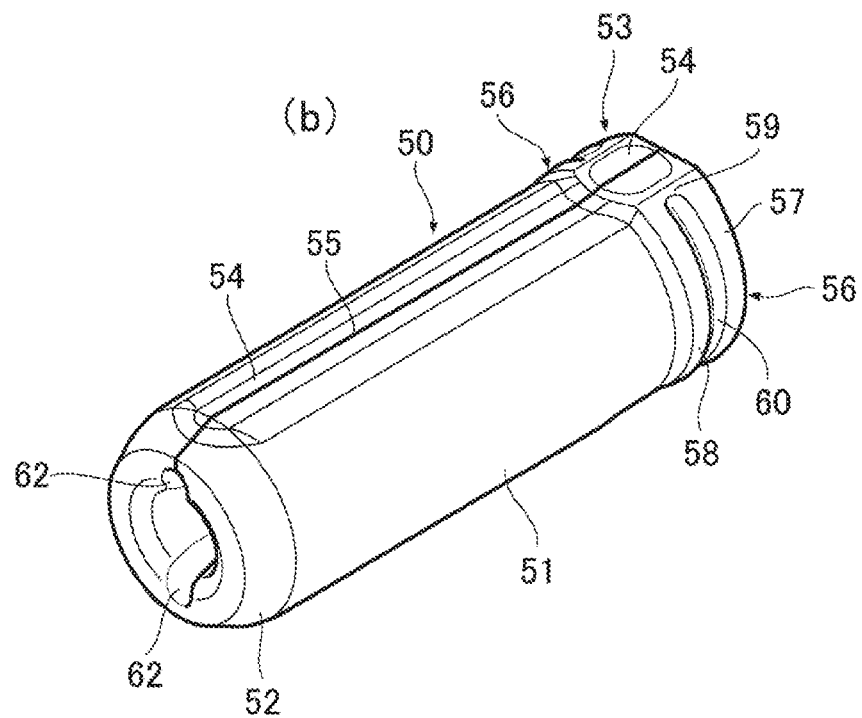

Fig. 7
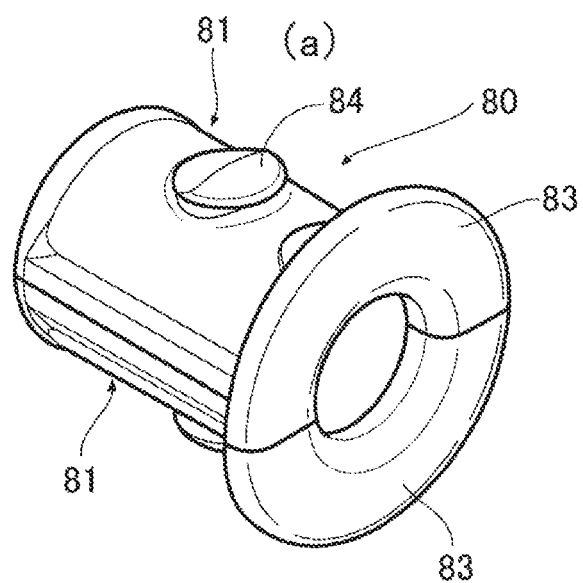
(a)
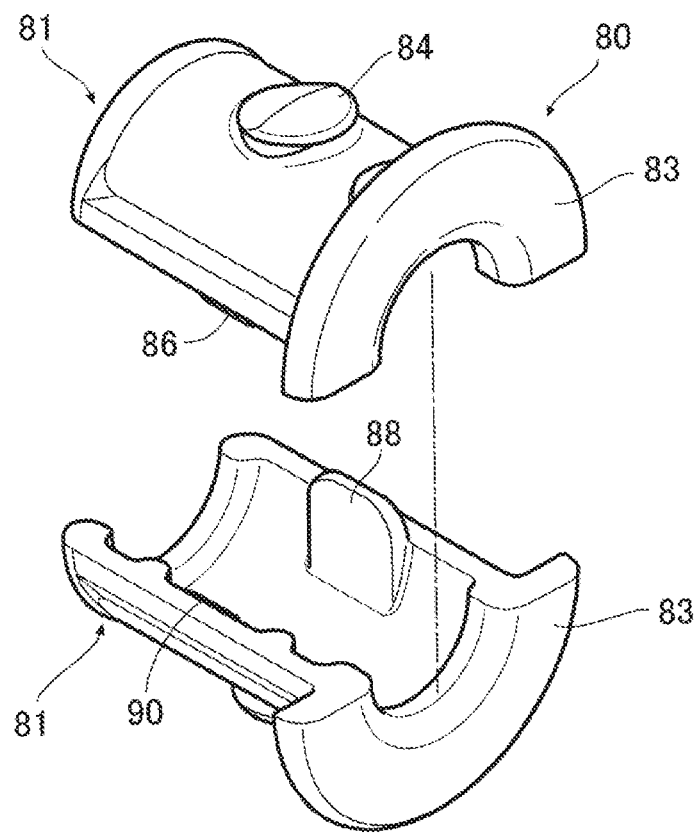
(b)

Fig. 14
(a) 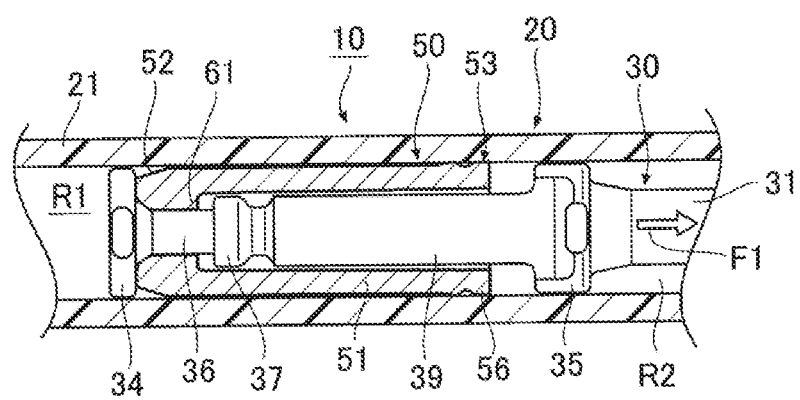
(b) 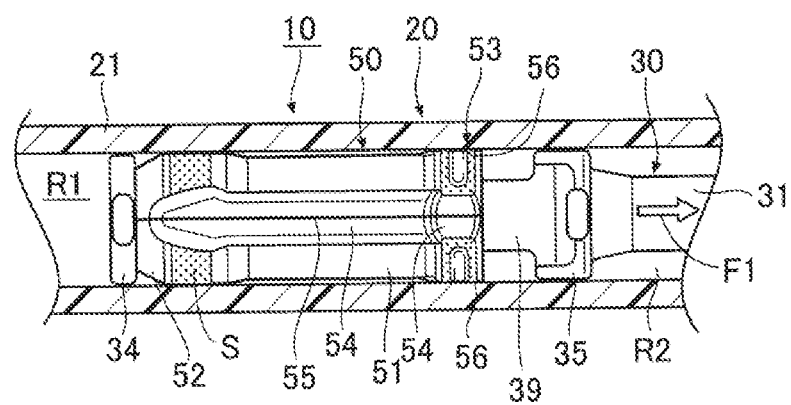

Fig. 36
(a)
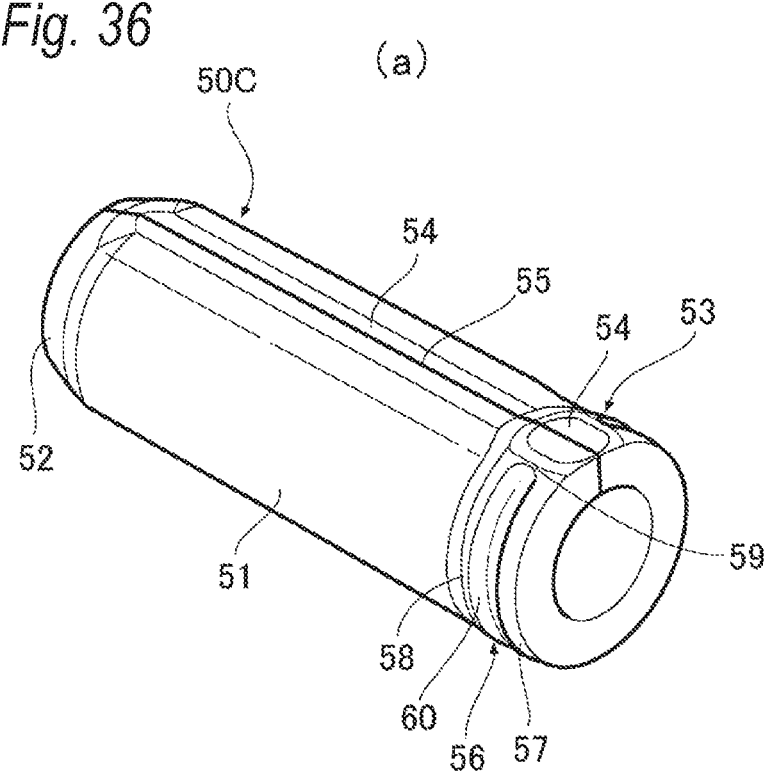
(b)
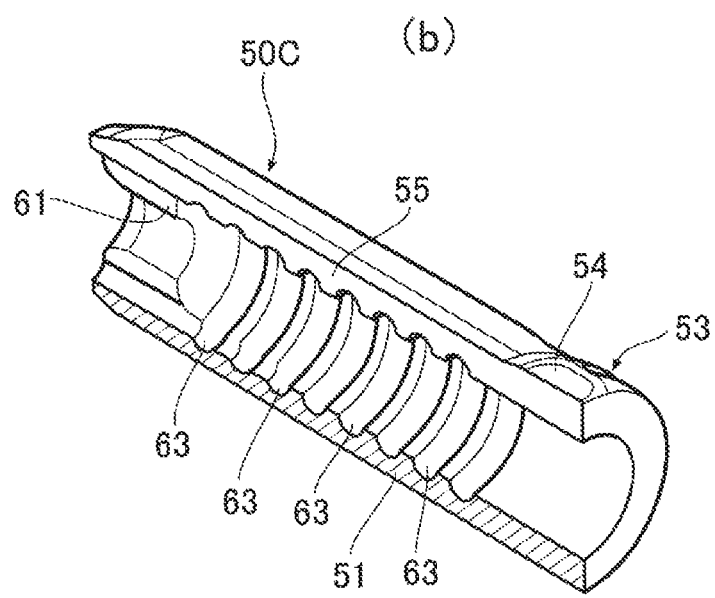

DAMPER

CROSS REFERENCE TO PRIOR APPLICATION

This applications is a National Stage Patent Application of PCT International Patent Application No. PCT/JP2019/012150 (filed on Mar. 22, 2019) under 35 U.S.C. § 371, which claims priority to Japanese Patent Application Nos. 2018-061798 (filed on Mar. 28, 2018), 2018-061919 (filed on Mar. 28, 2018), and 2018-062909 (filed on Mar. 28, 2018), which are all hereby incorporated by reference in their entirety.

TECHNICAL FIELD

The present invention relates to a damper used for braking such as an opening and closing operation of a glove box of an automobile, for example.

BACKGROUND ART

For example, a damper may be used in a glove box of an automobile in order to prevent a lid from being opened suddenly and allow the lid to be opened gently.

As such a damper, the following Patent Literature 1 discloses a damper including a cylinder opened on a base end side thereof, a rod inserted into the cylinder, and a piston provided at a tip end of the rod. The piston includes an adapter fixed to the tip end of the rod, a first seal member mounted on an outer circumference of the adapter on a tip end side, and a second seal member mounted on the outer circumference of the adapter at a position adjacent to the first seal member and closer to a base end of the cylinder. The first seal member has an annular shape with a V-shaped cross section, and is always in pressure contact with an inner circumference of the cylinder. On the other hand, the second seal member has a substantially cylindrical shape in which a plurality of grooves extending axially is provided on the outer circumference. When the rod is pushed into a tip end side of the cylinder, the second seal member is increased in diameter by receiving air pressure to be in pressure contact with the inner circumference of the cylinder, thereby applying a braking force together with the first seal member. On the other hand, when the rod is pulled out from an opening of the cylinder, the second seal member is reduced in diameter to discharge air in the cylinder, thereby releasing the braking force.

CITATION LIST

Patent Literature

Patent Literature 11 specification of U.S. Pat. No. 8,348,028 (U.S. Pat. No. 8,348,028B2)

SUMMARY OF INVENTION

Technical Problem

In opening and closing of a glove box or the like, when the glove box is opened slowly by hand, a braking force is weakened, and when the glove box is rapidly opened due to weight of a load in the glove box, the braking force is strengthened. Therefore, an impact force when the glove box is opened is desired to be reduced without impairing usability. Therefore, a damper having high load response performance in which a braking force varies depending on a moving speed of a rod is required.

In response to this request, in the damper disclosed in Patent Literature 1, since the first seal member and the second seal member are separate bodies, when the braking force is applied, the entire circumference of the second seal member having the substantially cylindrical shape is increased in diameter at a stretch to be in pressure contact with the inner circumference of the cylinder, so that it is difficult to provide the load response performance as described above.

Therefore, an object of the present invention is to provide a damper having high load response performance.

Solution to Problem

In order to achieve the above object, the present provides a damper that is attached between a pair of members close to and away from each other and applies a braking force when the pair of members is close to or away from each other, the damper including:

a cylindrical cylinder having an opening at an end portion thereof:

a rod movably inserted through the opening of the cylinder and including an engaging portion; and a piston formed of an elastic resin material, which extends along an axial direction of the rod in a predetermined length and is mounted to the rod so as to surround the rod, wherein the piston includes a convex portion provided on a side of one end in an axial direction and always coming in pressure contact with an inner circumference of the cylinder, and during braking of the damper, the engaging portion of the rod abuts against another end of the piston, so that an axial compression force acts on the piston between the engaging portion and the convex portion in pressure contact with the inner circumference of the cylinder.

Advantageous Effects of Invention

According to the present invention, when the rod moves in the braking direction with respect to the cylinder, the engaging portion of the rod abuts against the other end of the piston, and the piston is pressed by the engaging portion. On the other hand, since the convex portion at one end of the piston is always in pressure contact with the inner circumference of the cylinder, the axial compression force acts on the piston, and the piston is compressed from the other end side and in pressure contact with the inner circumference of the cylinder, thereby increasing the braking force. In this case, as a moving speed of the rod in the braking direction becomes higher, the axial compression force on the piston increases and pressure contact area of the piston increases, so that the braking force can be further increased. In this way, a damper having high load response performance, in which the braking force varies depending on the moving speed of the rod, can be provided.

BRIEF DESCRIPTION OF DRAWINGS

FIG. 3 shows a piston constituting the damper. (a) of FIG. 3 is a perspective view thereof, and (b) of FIG. 3 is a perspective view when viewed from a direction different from that of (a) of FIG. 3.

FIG. 7 shows a cap constituting the damper. (a) of FIG. 7 is a perspective view of the assembly, and (b) of FIG. 7 is an exploded perspective view.

Figure 13:
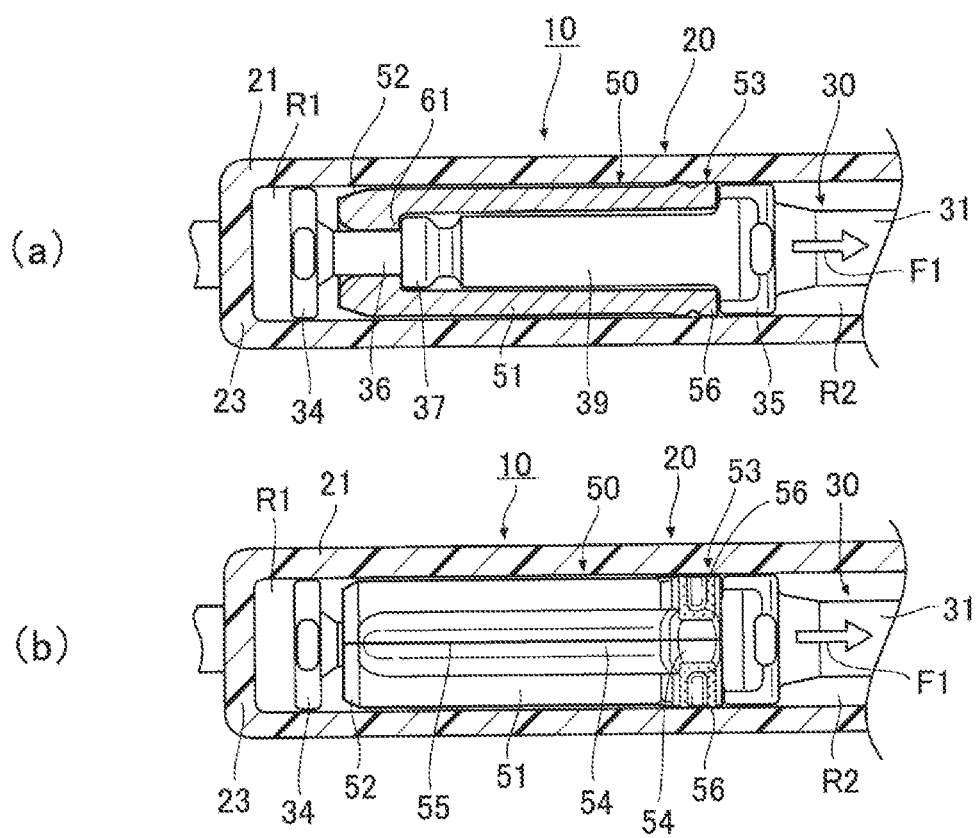

(a) of FIG. 13 is an enlarged sectional view of a main part when the rod is stationary, and (b) of FIG. 13 is an enlarged explanatory view of the main part for explaining a pressure contact state of the piston with respect to an inner circumference of the cylinder in (a) of FIG. 13.

(a) of FIG. 14 is an enlarged sectional view of a main part when the rod moves in the damper braking direction from (a) of FIG. 13, and (b) of FIG. 14 is an enlarged explanatory view of the main part for explaining a pressure contact state of the piston with respect to the inner circumference of the cylinder in (a) of FIG. 14.

Figure 15:
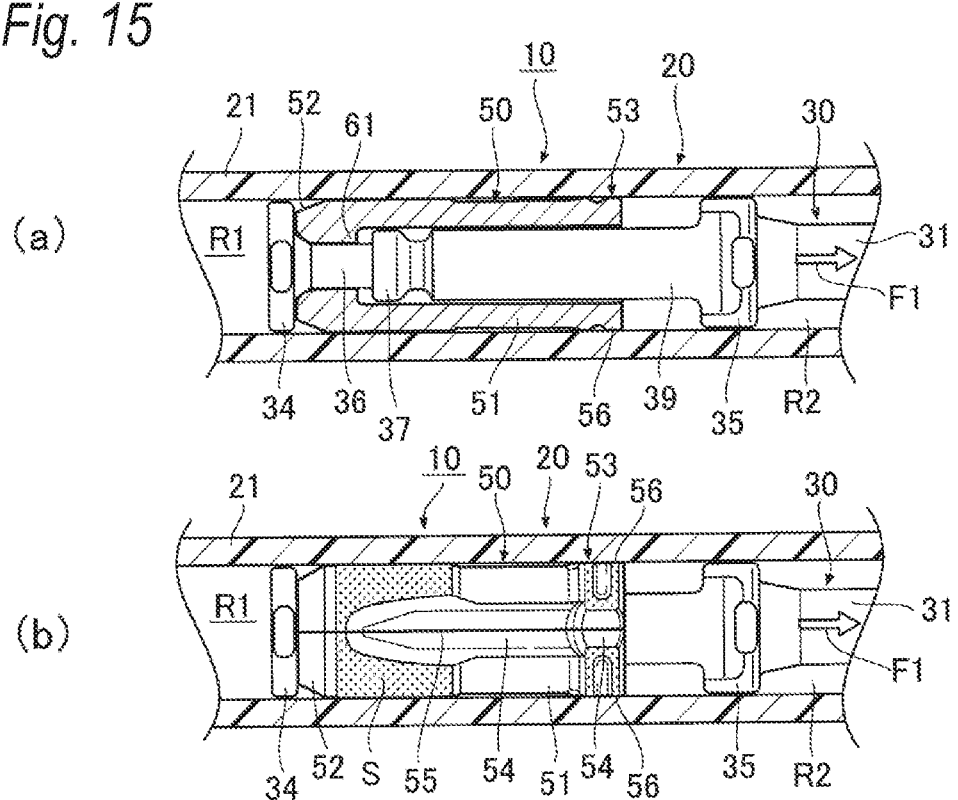

(a) of FIG. 15 is an enlarged sectional view of a main part when the rod moves in the damper braking direction from the (a) of FIG. 14, and (b) of FIG. 15 is an enlarged explanatory view of the main part for explaining a pressure contact state of the piston with respect to the inner circumference of the cylinder in (a) of FIG. 15.

Figure 16:
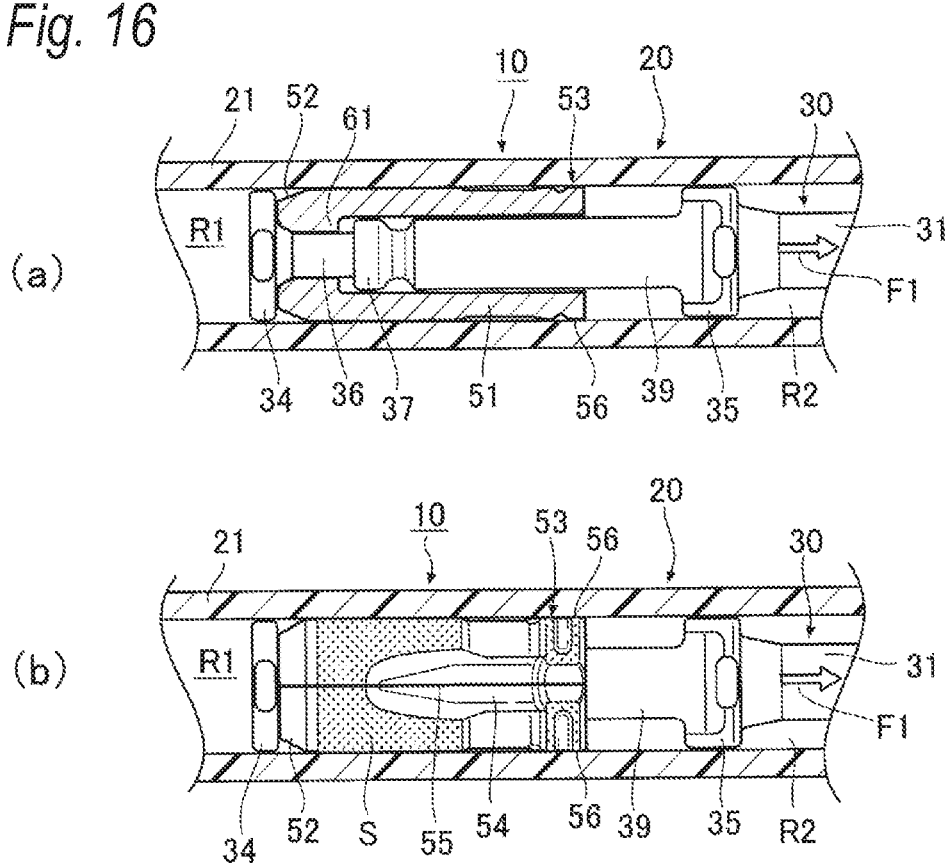

(a) of FIG. 16 is an enlarged sectional view of a main part when the rod moves in the damper braking direction from the (a) of FIG. 15, and (b) of FIG. 16 is an enlarged explanatory view of the main part for explaining a pressure contact state of the piston with respect to the inner circumference of the cylinder in (a) of FIG. 16.

Figure 17:
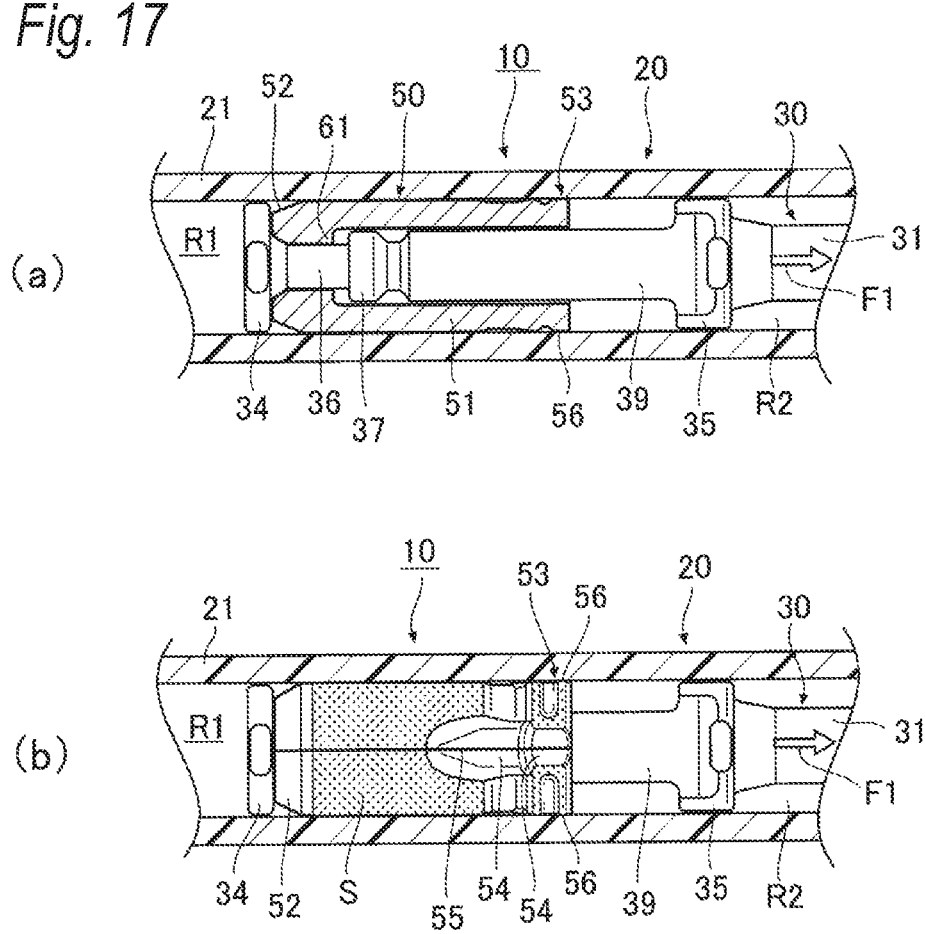

(a) of FIG. 17 is an enlarged sectional view of a main part when the rod moves in the damper braking direction from the (a) of FIG. 16, and (b) of FIG. 17 is an enlarged explanatory view of the main part for explaining a pressure contact state of the piston with respect to the inner circumference of the cylinder in (a) of FIG. 17.

Figure 18:
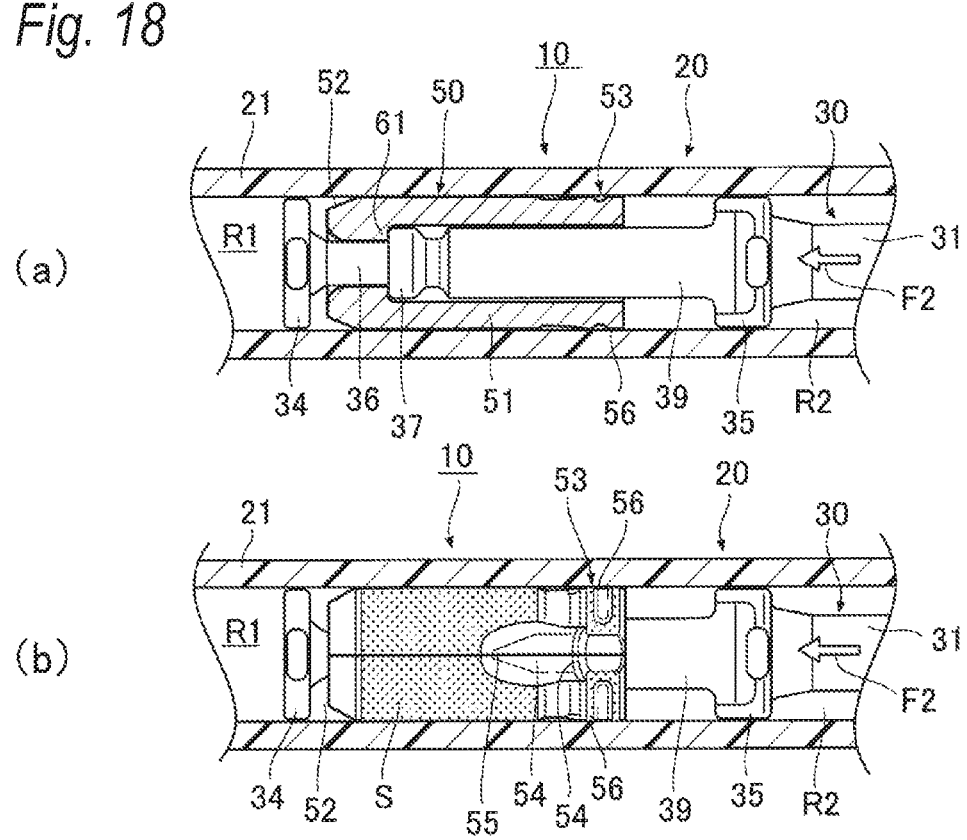

FIG. 18 shows a first state of the piston when the rod moves in the damper returning direction. (a) of FIG. 18 is an enlarged sectional view of a main part thereof, and (b) of FIG. 18 is an enlarged explanatory view of the main part for explaining a pressure contact state of the piston with respect to the inner circumference of the cylinder in (a) of FIG. 18.

Figure 19:
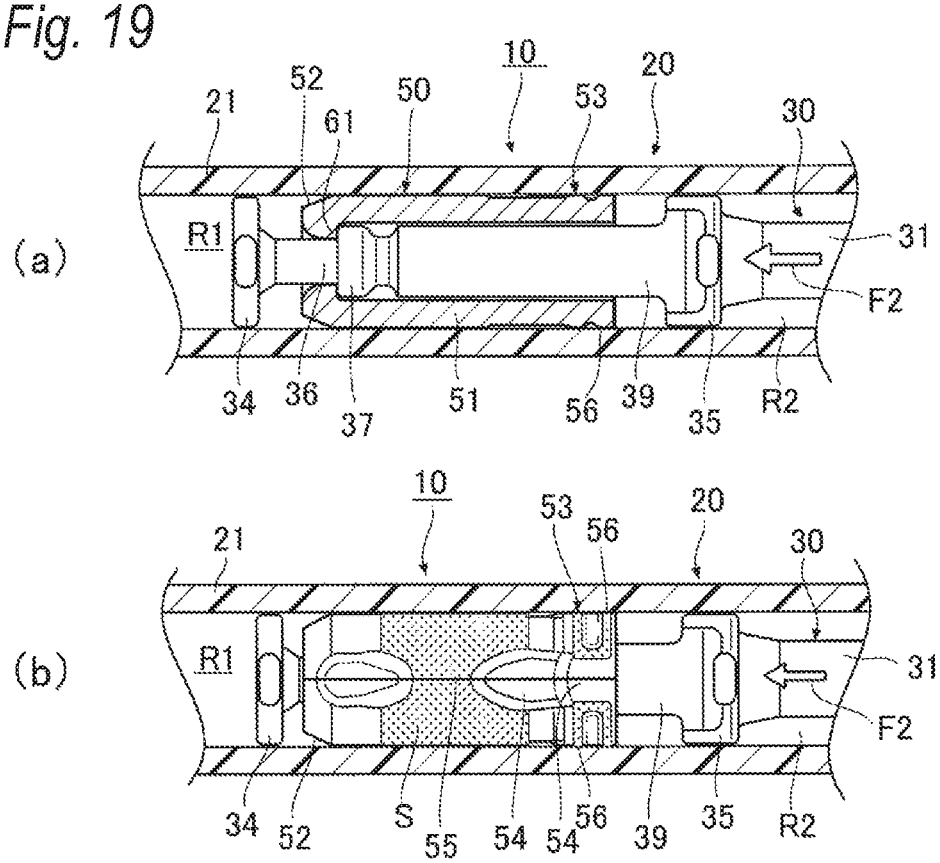

FIG. 19 shows a second state of the piston when the rod moves in the damper returning direction. (a) of FIG. 19 is an enlarged sectional view of a main part thereof, and (b) of FIG. 19 is an enlarged explanatory view of the main part for explaining a pressure contact state of the piston with respect to the inner circumference of the cylinder in (a) of FIG. 19.

Figure 20:
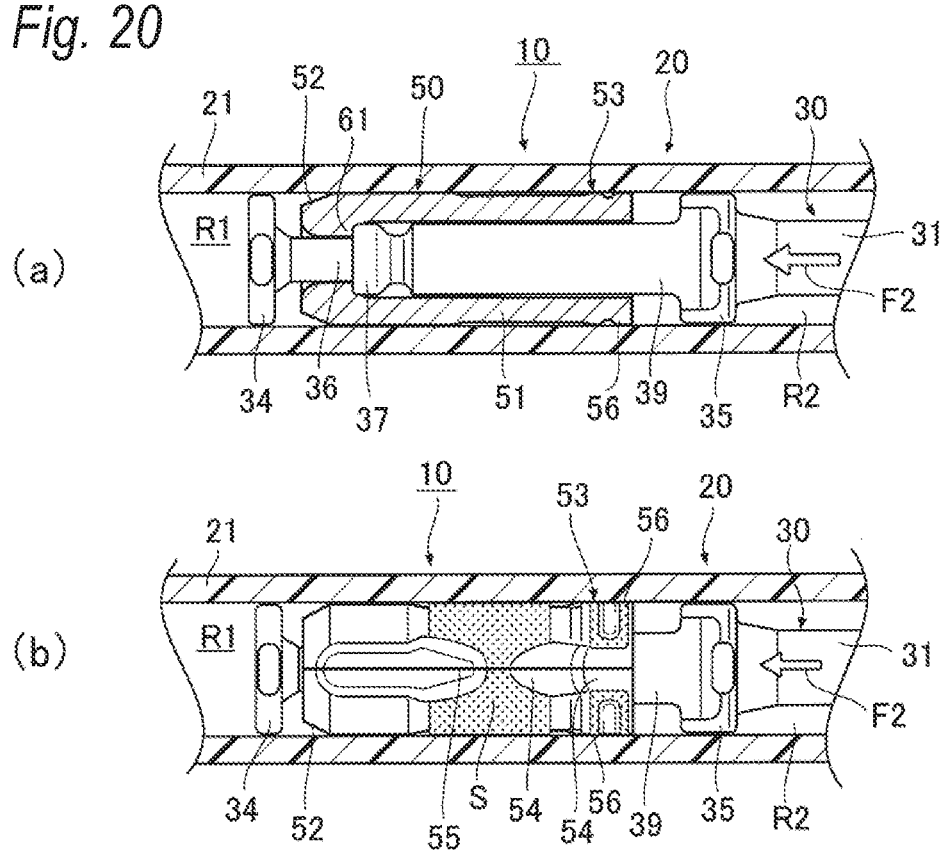

FIG. 20 shows a third state of the piston when the rod moves in the damper returning direction. (a) of FIG. 20 is an enlarged sectional view of a main part thereof, and (b) of FIG. 20 is an enlarged explanatory view of the main part for explaining a pressure contact state of the piston with respect to the inner circumference of the cylinder in (a) of FIG. 20.

Figure 21:
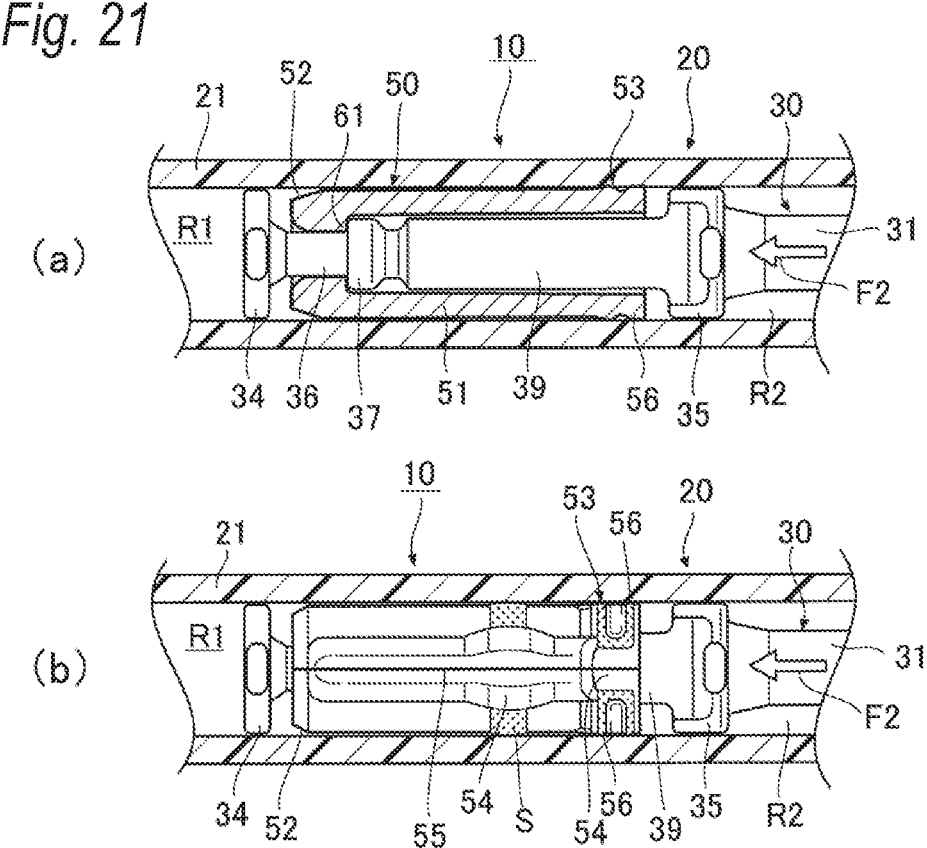

FIG. 21 shows a fourth state of the piston when the rod moves in the damper returning direction. (a) of FIG. 21 is an enlarged sectional view of a main part thereof, and (b) of FIG. 21 is an enlarged explanatory view of the main part for explaining a pressure contact state of the piston with respect to the inner circumference of the cylinder in (a) of FIG. 21.

Figure 22:
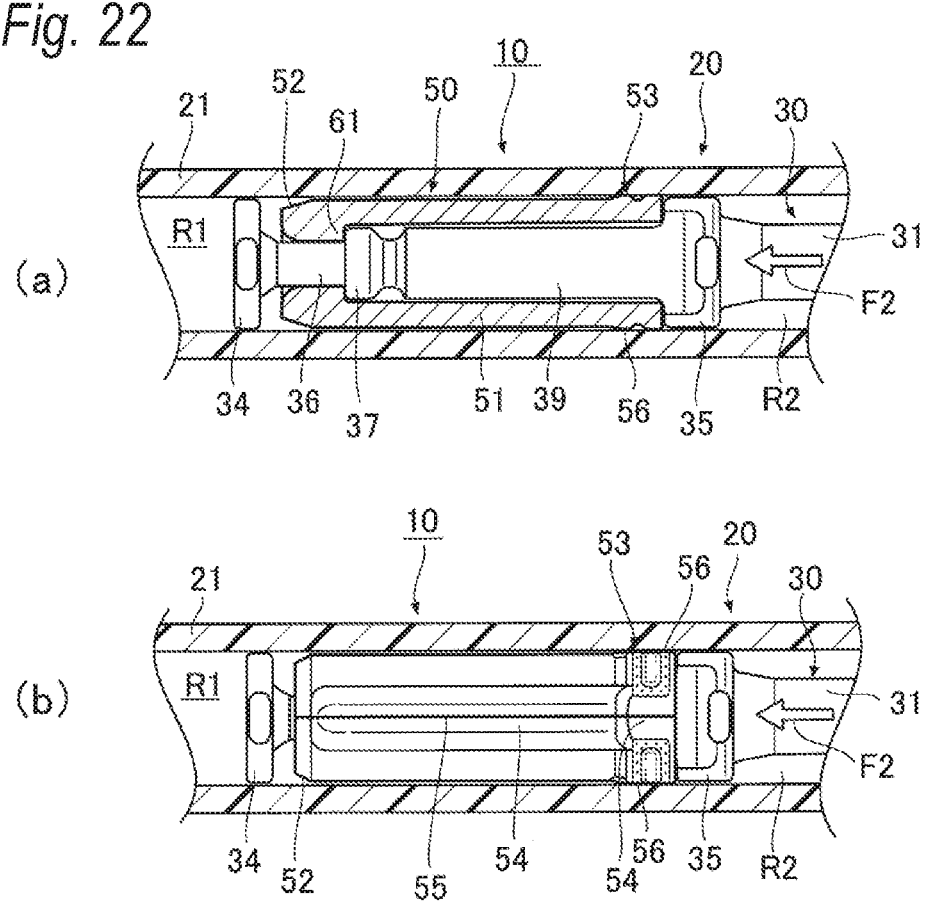

FIG. 22 shows a fifth state of the piston when the rod moves in the damper returning direction. (a) of FIG. 22 is an enlarged sectional view of a main part thereof, and (b) of FIG. 22 is an enlarged explanatory view of the main part for explaining a pressure contact state of the piston with respect to the inner circumference of the cylinder in (a) of FIG. 22.

Figure 23:
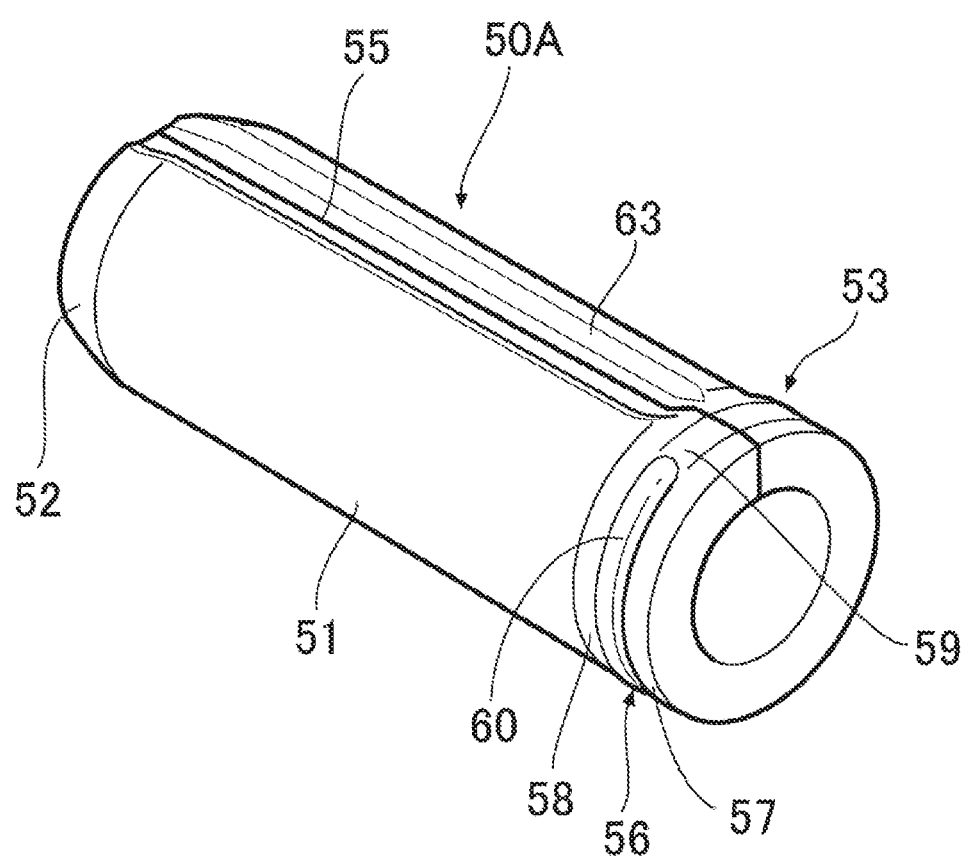

FIG. 23 shows a damper according to a second embodiment of the present invention, and is a perspective view of a piston constituting the damper.

Figure 24:
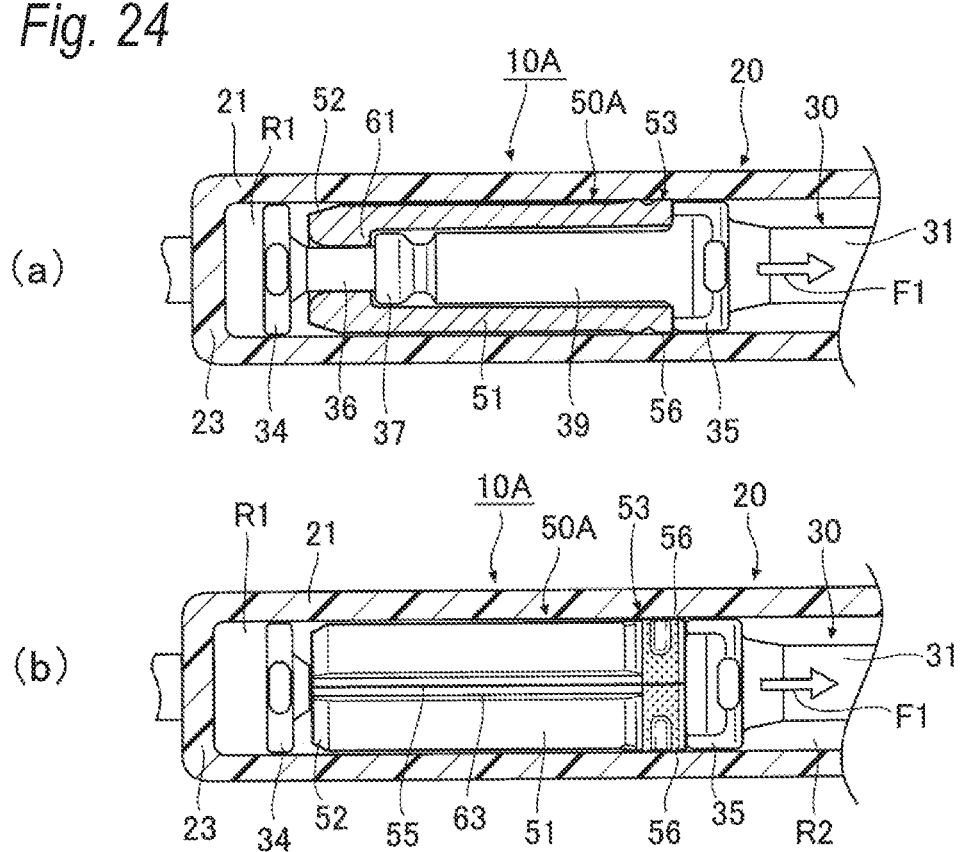

(a) of FIG. 24 is an enlarged sectional view of a main part when the rod is stationary, and (b) of FIG. 24 is an enlarged explanatory view of the main part for explaining a pressure contact state of the piston with respect to an inner circumference of a cylinder in (a) of FIG. 24.

Figure 25:
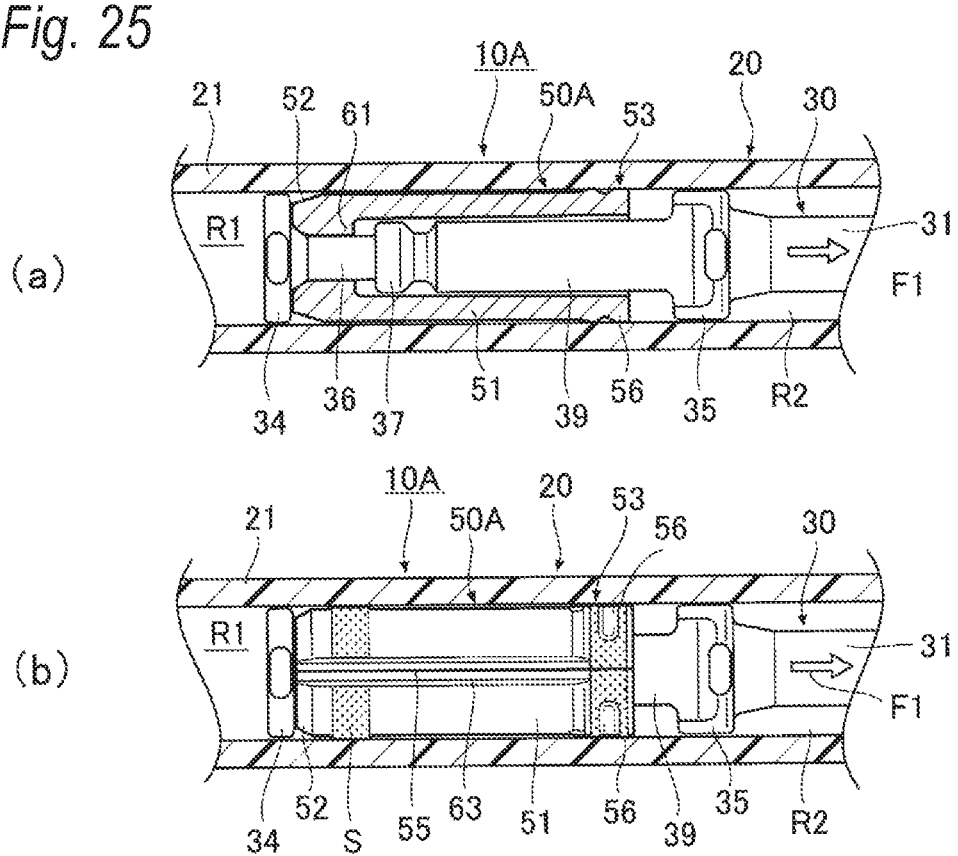

(a) of FIG. 25 is an enlarged sectional view of a main part when the rod moves in a damper braking direction from (a) of FIG. 24, and (b) of FIG. 25 is an enlarged explanatory view of the main part for explaining a pressure contact state of the piston with respect to the inner circumference of the cylinder in (a) of FIG. 25.

Figure 26:
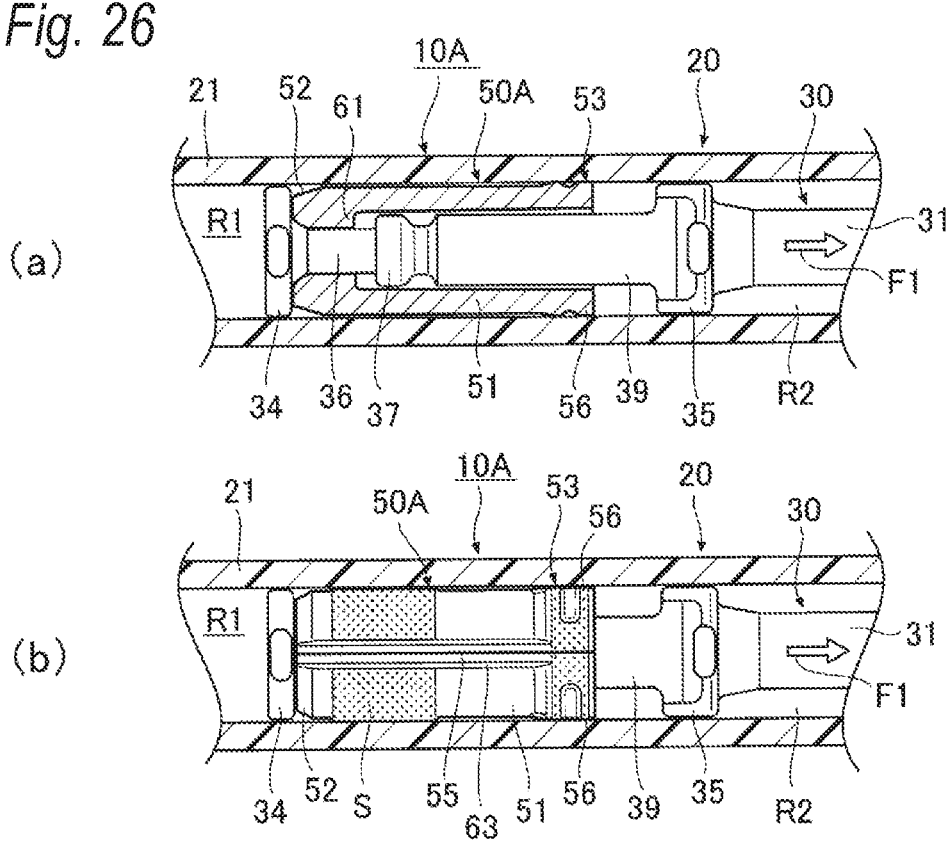

(a) of FIG. 26 is an enlarged sectional view of a main part when the rod moves in the damper braking direction from the (a) of FIG. 25, and (b) of FIG. 26 is an enlarged explanatory view of the main part for explaining a pressure contact state of the piston with respect to the inner circumference of the cylinder in (a) of FIG. 26.

Figure 27:
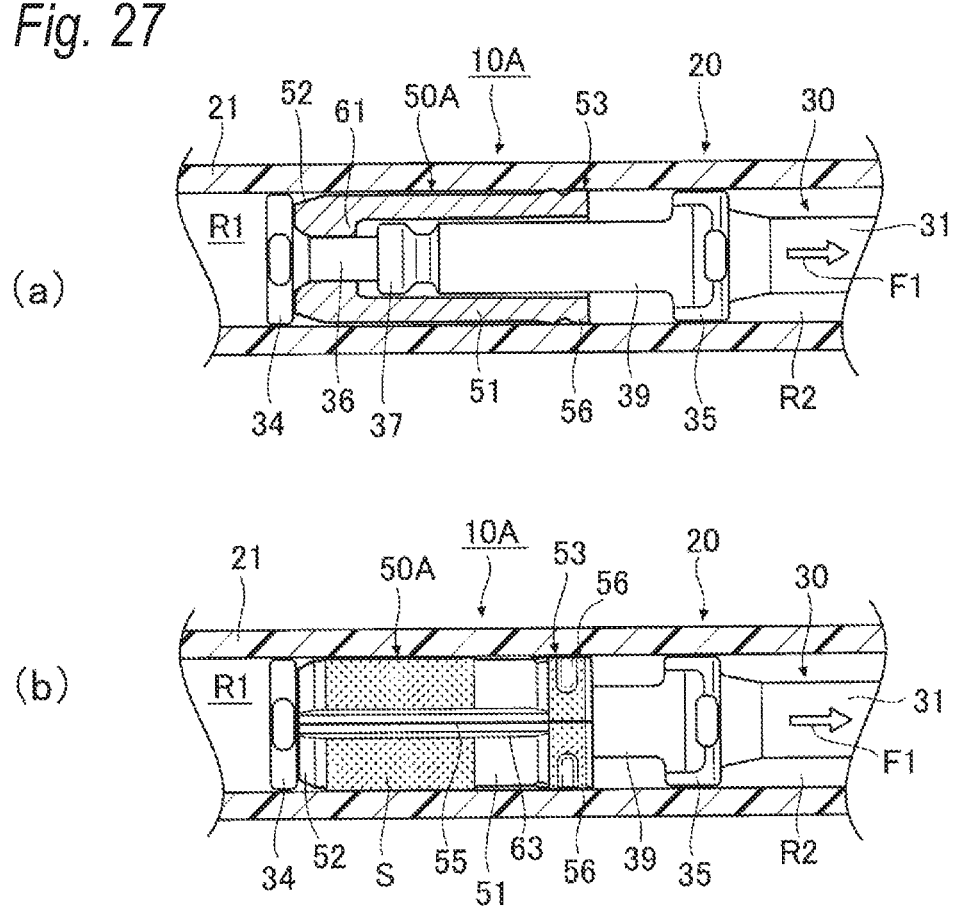

(a) of FIG. 27 is an enlarged sectional view of a main part when the rod moves in the damper braking direction from the (a) of FIG. 26, and (b) of FIG. 27 is an enlarged explanatory view of the main part for explaining a pressure contact state of the piston with respect to the inner circumference of the cylinder in (a) of FIG. 27.

Figure 28:
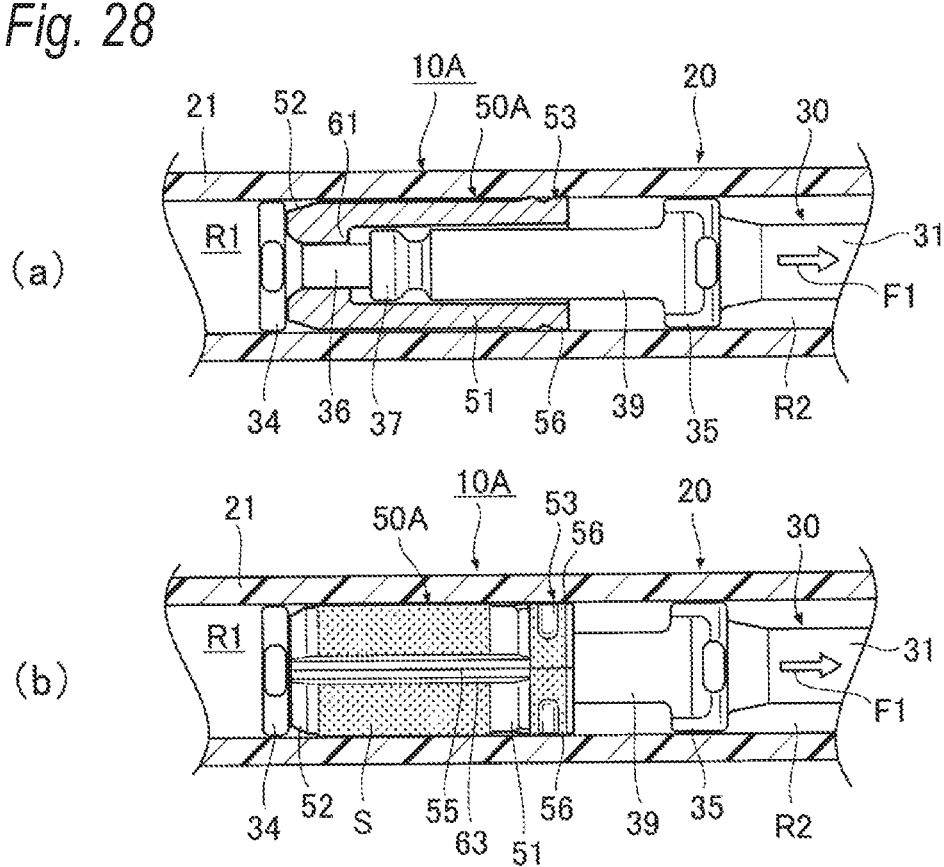

(a) of FIG. 28 is an enlarged sectional view of a main part when the rod moves in the damper braking direction from the (a) of FIG. 27, and (b) of FIG. 28 is an enlarged explanatory view of the main part for explaining a pressure contact state of the piston with respect to the inner circumference of the cylinder in (a) of FIG. 28.

Figure 29:
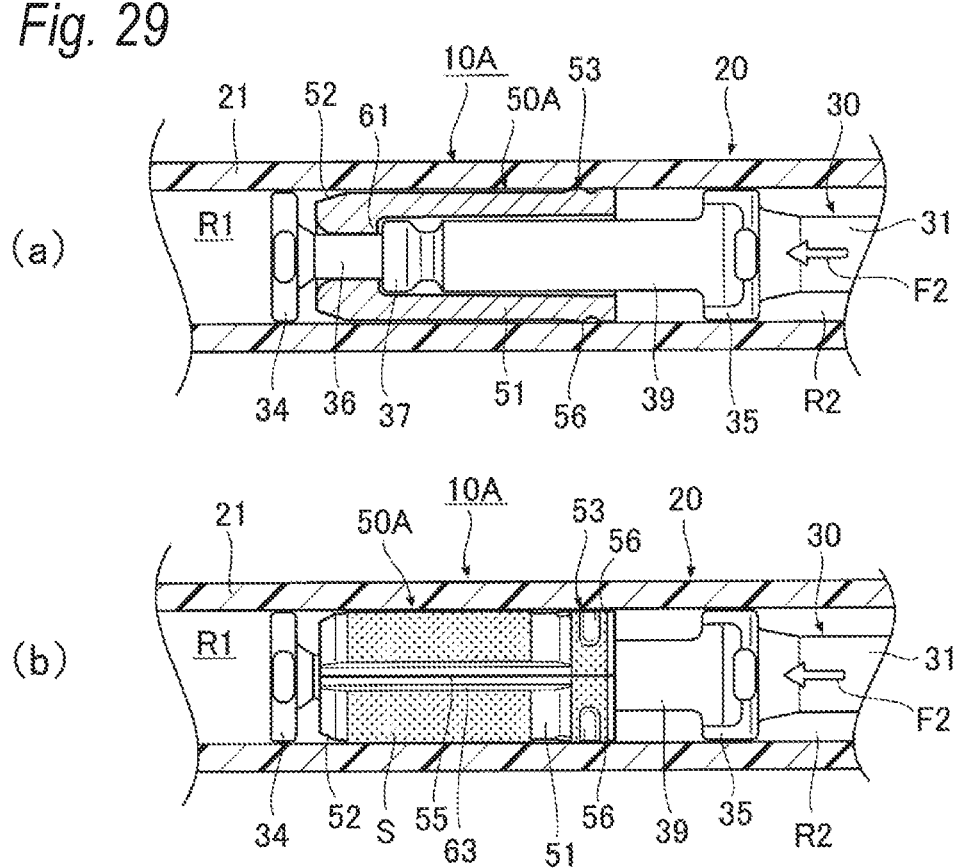

FIG. 29 shows an initial state of the piston when the rod moves in a damper returning direction. (a) of FIG. 29 is an enlarged sectional view of a main part thereof, and (b) of FIG. 29 is an enlarged explanatory view of the main part for explaining a pressure contact state of the piston with respect to the inner circumference of the cylinder in (a) of FIG. 29.

Figure 30:
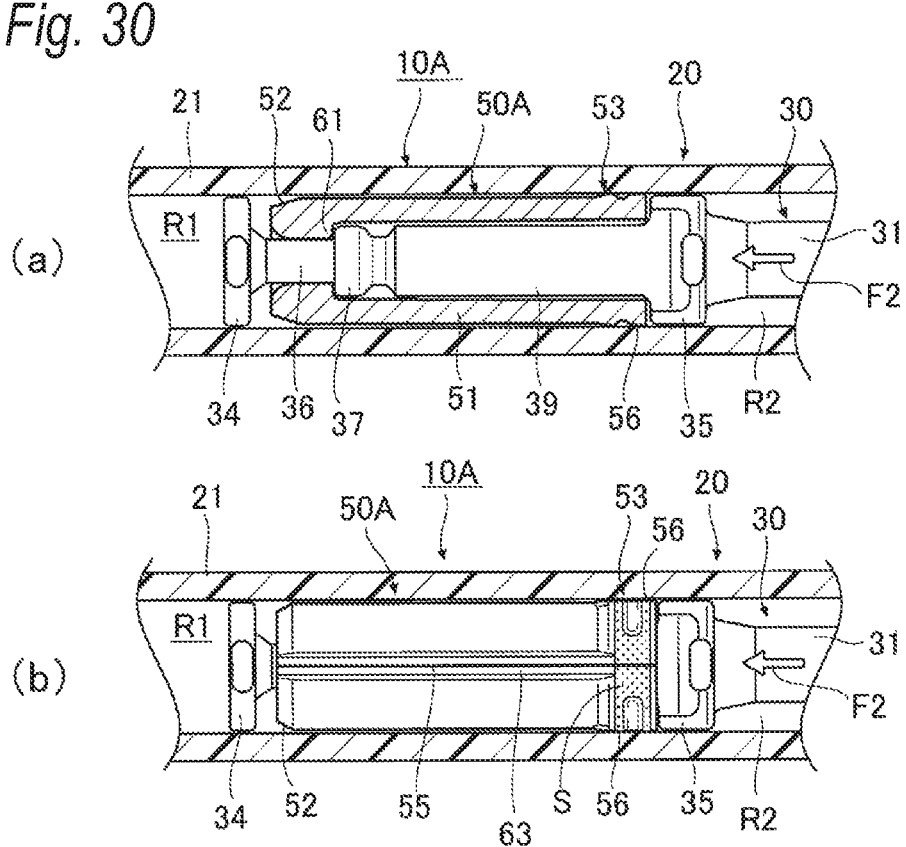

FIG. 30 shows a state when the rod moves in the damper returning direction and the piston returns to an original shape. (a) of FIG. 30 is an enlarged sectional view of a main part thereof, and (b) of FIG. 30 is an enlarged explanatory view of the main part for explaining a pressure contact state of the piston with respect to the inner circumference of the cylinder in (a) of FIG. 30.

Figure 31:
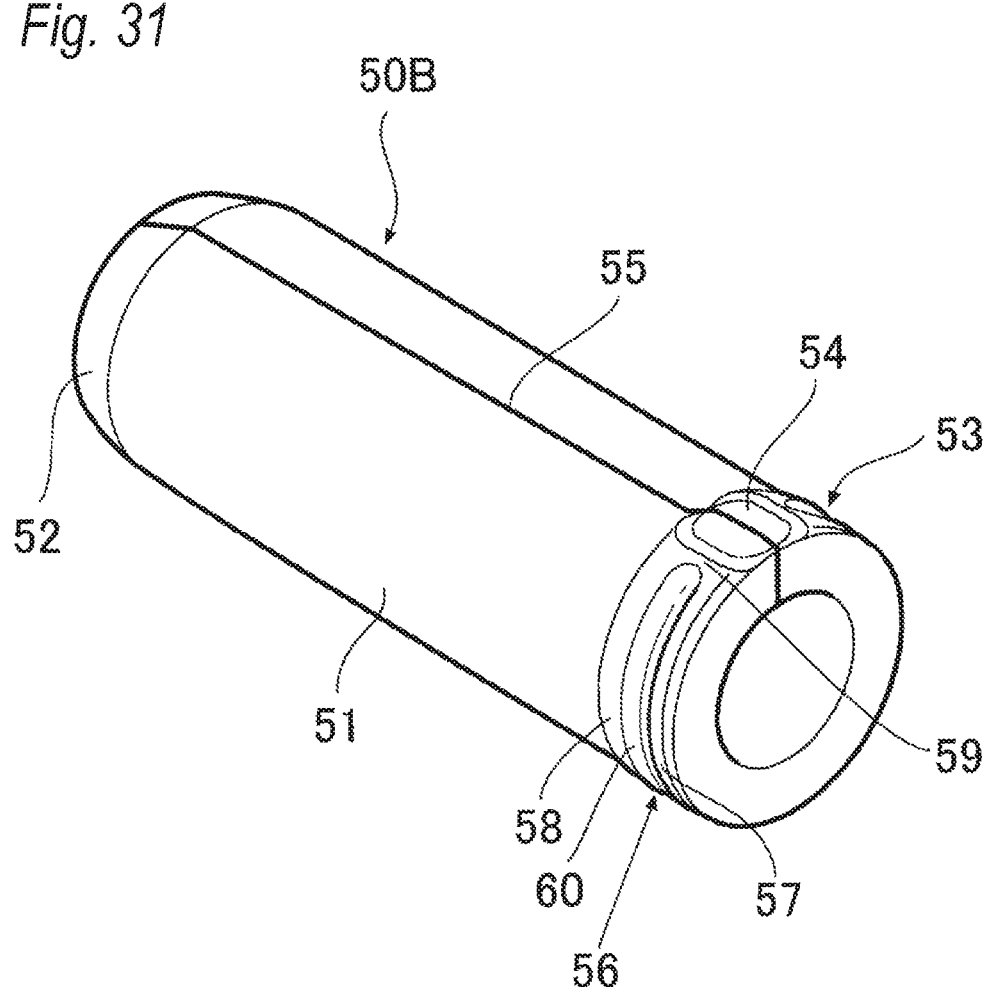

FIG. 31 shows a damper according to a third embodiment of the present invention, and is a perspective view of a piston constituting the damper.

Figure 32:
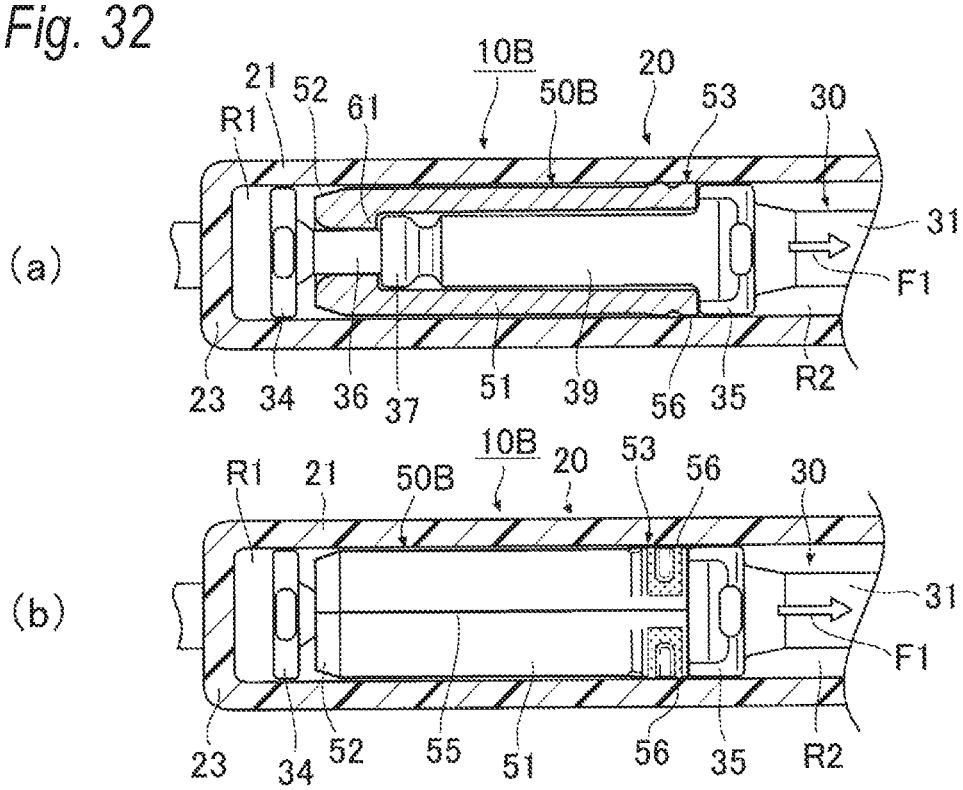

(a) of FIG. 32 is an enlarged sectional view of a main part when the rod is stationary, and (b) of FIG. 32 is an enlarged explanatory view of the main part for explaining a pressure contact state of the piston with respect to an inner circumference of a cylinder in (a) of FIG. 32.

Figure 33:
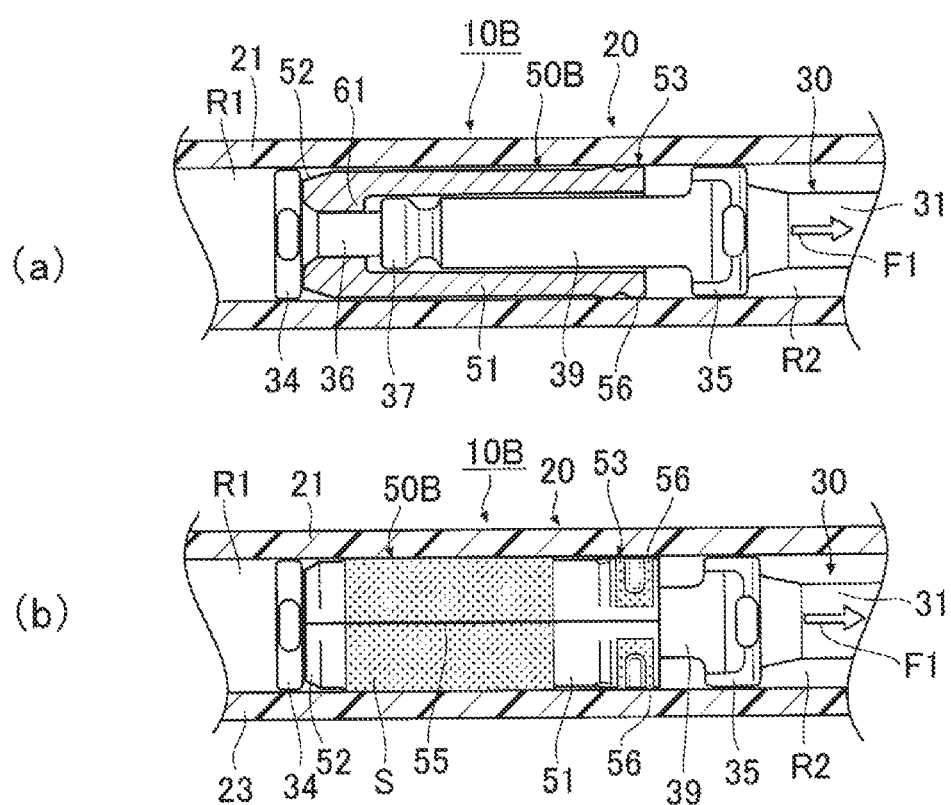

(a) of FIG. 33 is an enlarged sectional view of a main part when the rod moves in a damper braking direction from the (a) of FIG. 32, and (b) of FIG. 33 is an enlarged explanatory view of the main part for explaining a pressure contact state of the piston with respect to the inner circumference of the cylinder in (a) of FIG. 33.

Figure 34:
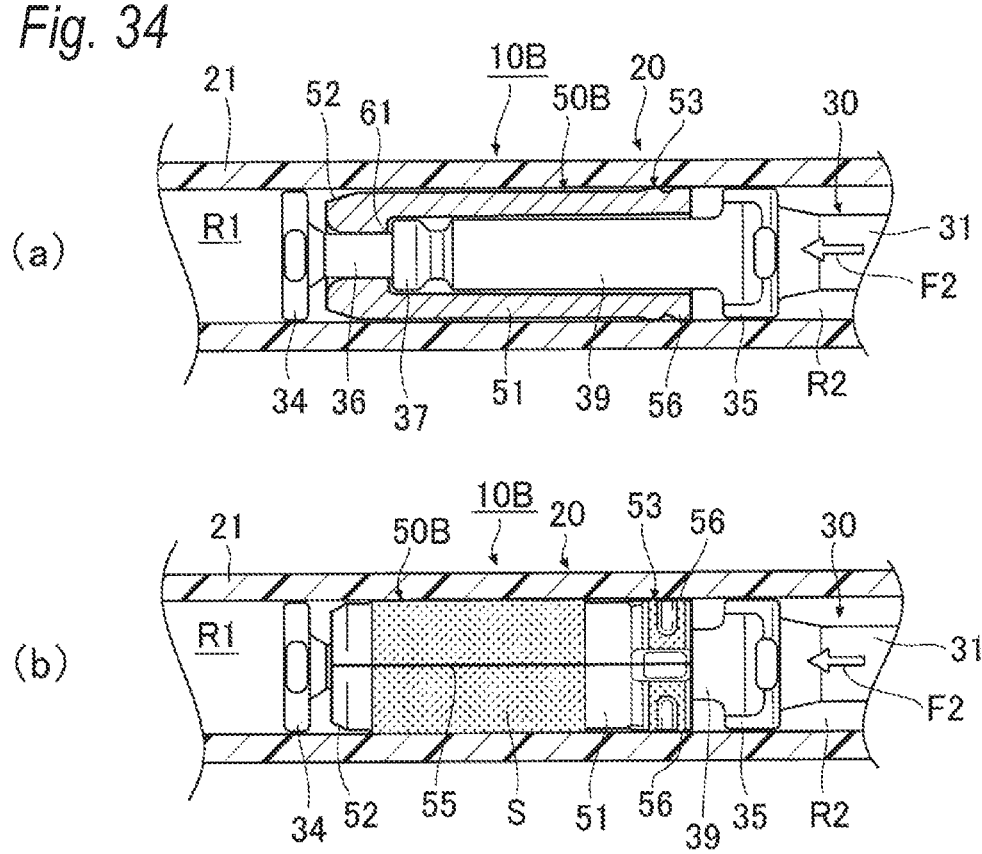

FIG. 34 shows an initial state of the piston when the rod moves in a damper returning direction. (a) of FIG. 34 is an enlarged sectional view of a main part thereof, and (b) of FIG. 34 is an enlarged explanatory view of the main part for explaining a pressure contact state of the piston with respect to the inner circumference of the cylinder in (a) of FIG. 34.

Figure 35:
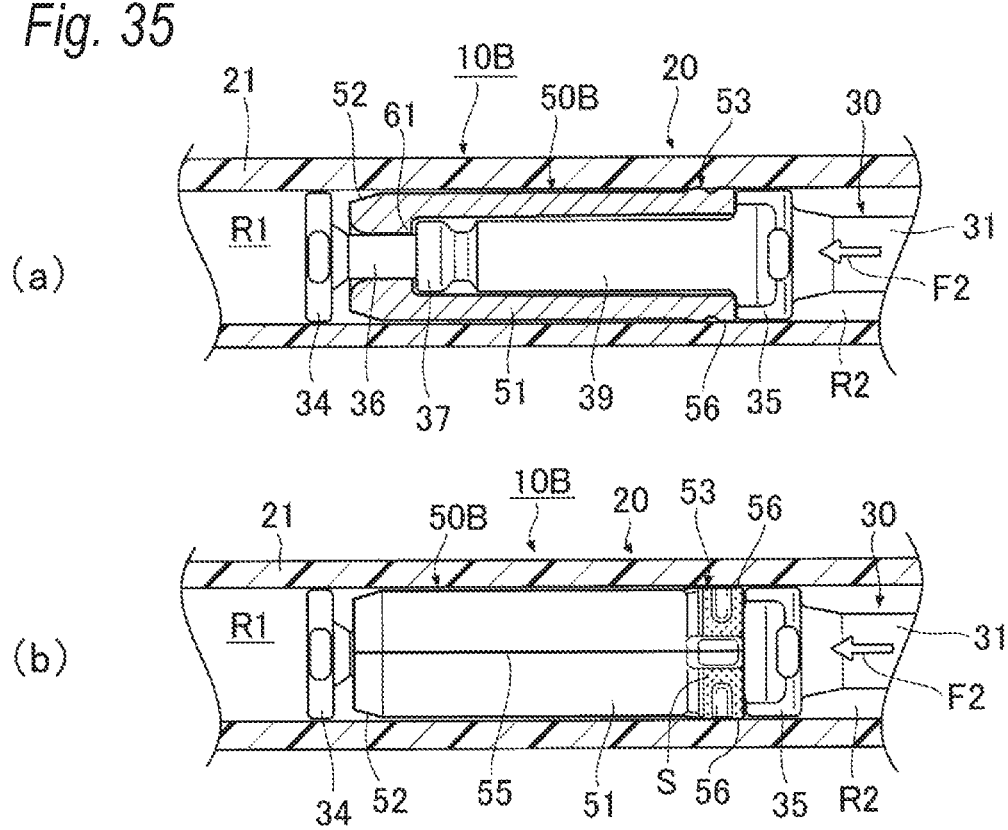

FIG. 35 shows a state when the rod moves in the damper returning direction and the piston returns to an original shape. (a) of FIG. 35 is an enlarged sectional view of a main part thereof, and (b) of FIG. 35 is an enlarged explanatory view of the main part for explaining a pressure contact state of the piston with respect to the inner circumference of the cylinder in (a) of FIG. 35.

FIG. 36 shows a damper according to a fourth embodiment of the present invention, and is a perspective view of a piston constituting the damper.

Figure 37:
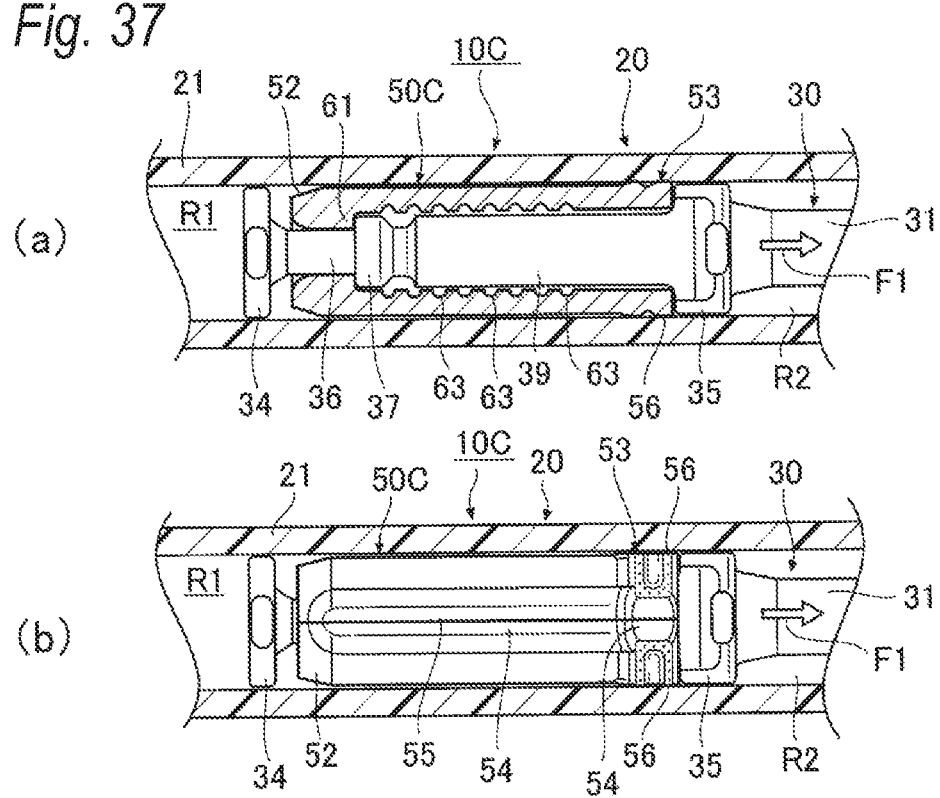

(a) of FIG. 37 is an enlarged sectional view of a main part when the rod is stationary, and (b) of FIG. 37 is an enlarged explanatory view of the main part for explaining a pressure contact state of the piston with respect to an inner circumference of a cylinder in (a) of FIG. 37.

Figure 38:
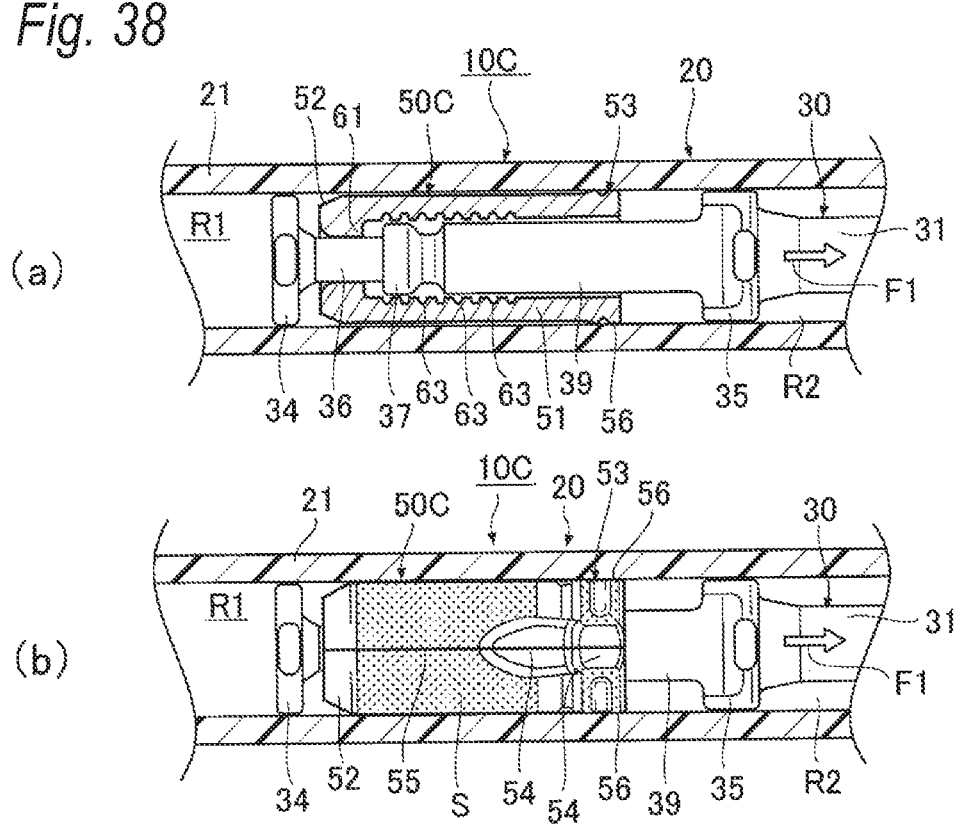

(a) of FIG. 38 is an enlarged sectional view of a main part when the rod moves in a damper braking direction from the (a) of FIG. 37, and (b) of FIG. 38 is an enlarged explanatory view of the main part for explaining a pressure contact state of the piston with respect to the inner circumference of the cylinder in (a) of FIG. 38.

Figure 39:
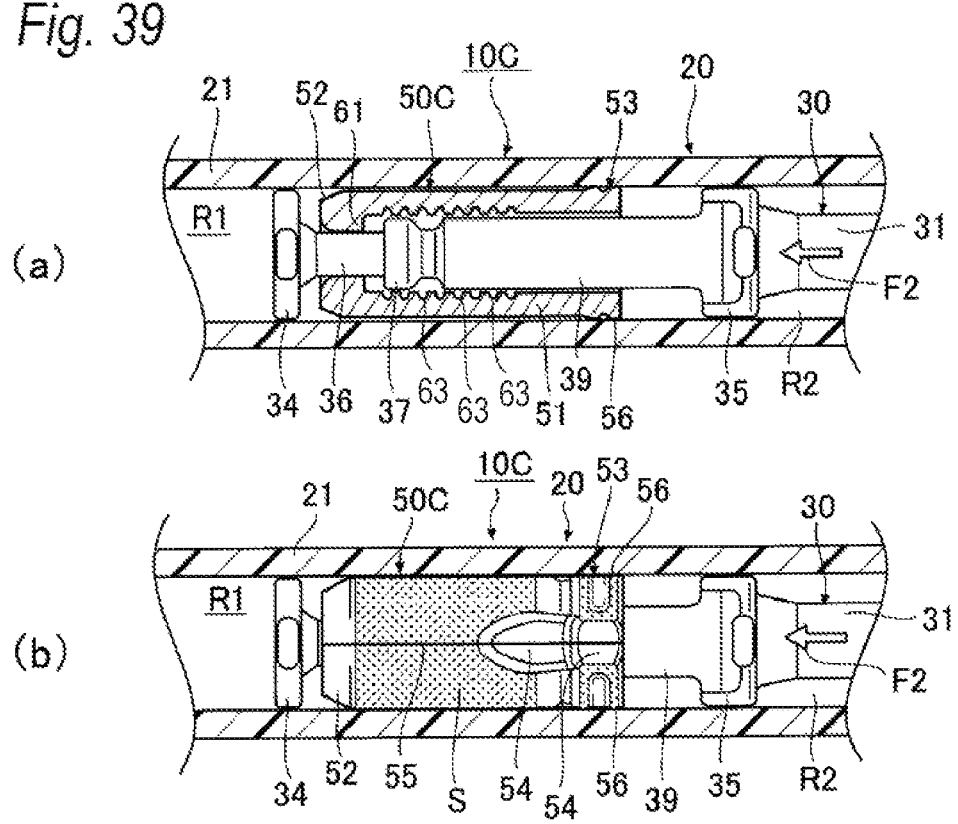

FIG. 39 shows an initial state of the piston when the rod moves in a damper returning direction. (a) of FIG. 39 is an enlarged sectional view of a main part thereof, and (b) of FIG. 39 is an enlarged explanatory view of the main part for explaining a pressure contact state of the piston with respect to the inner circumference of the cylinder in (a) of FIG. 39.

Figure 40:
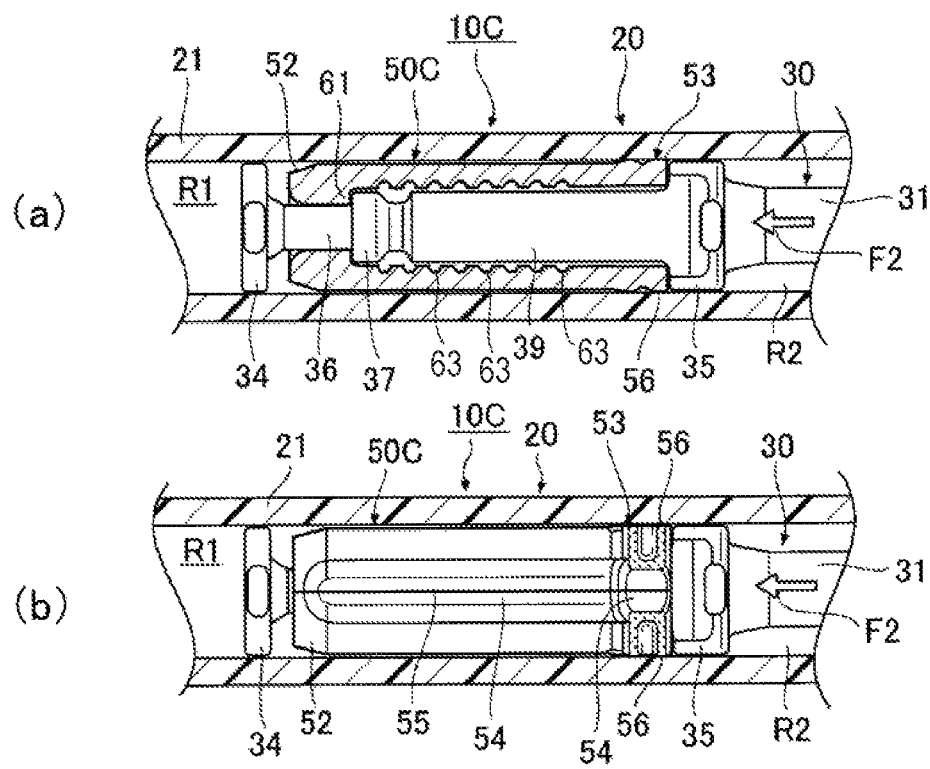

FIG. 40 shows a state when the rod moves in the damper returning direction and the piston returns to an original shape. (a) of FIG. 40 is an enlarged sectional view of a main part thereof, and (b) of FIG. 40 is an enlarged explanatory view of the main part for explaining a pressure contact state of the piston with respect to the inner circumference of the cylinder in (a) of FIG. 40.

Figure 41:
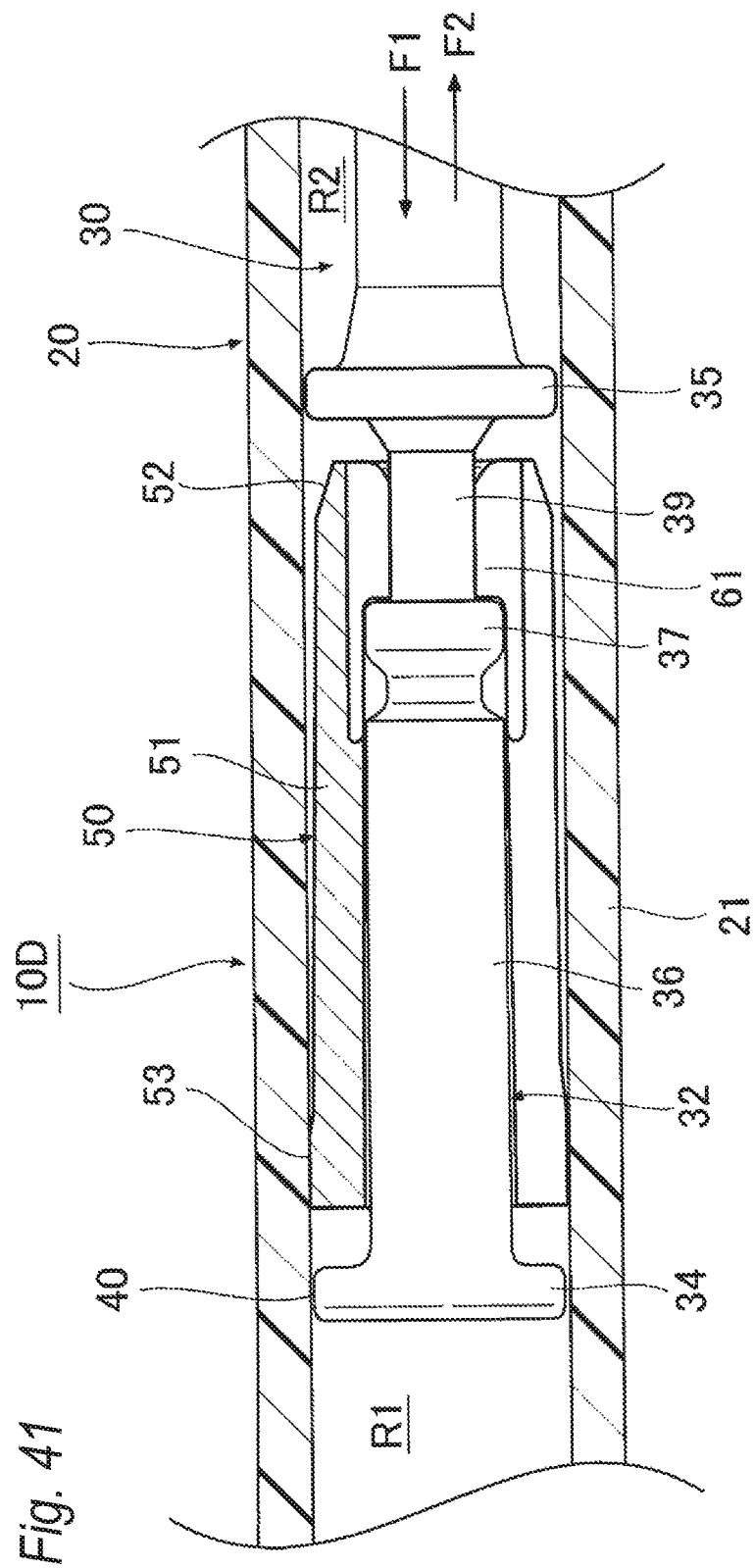

FIG. 41 is an enlarged explanatory view of a main part of a damper in which the damper braking direction is opposite to that of the damper according to the above embodiments.

DESCRIPTION OF EMBODIMENTS

Hereinafter, a damper according to a first embodiment of the present invention will be described with reference to FIGS. 1 to 22.

Figure 1:
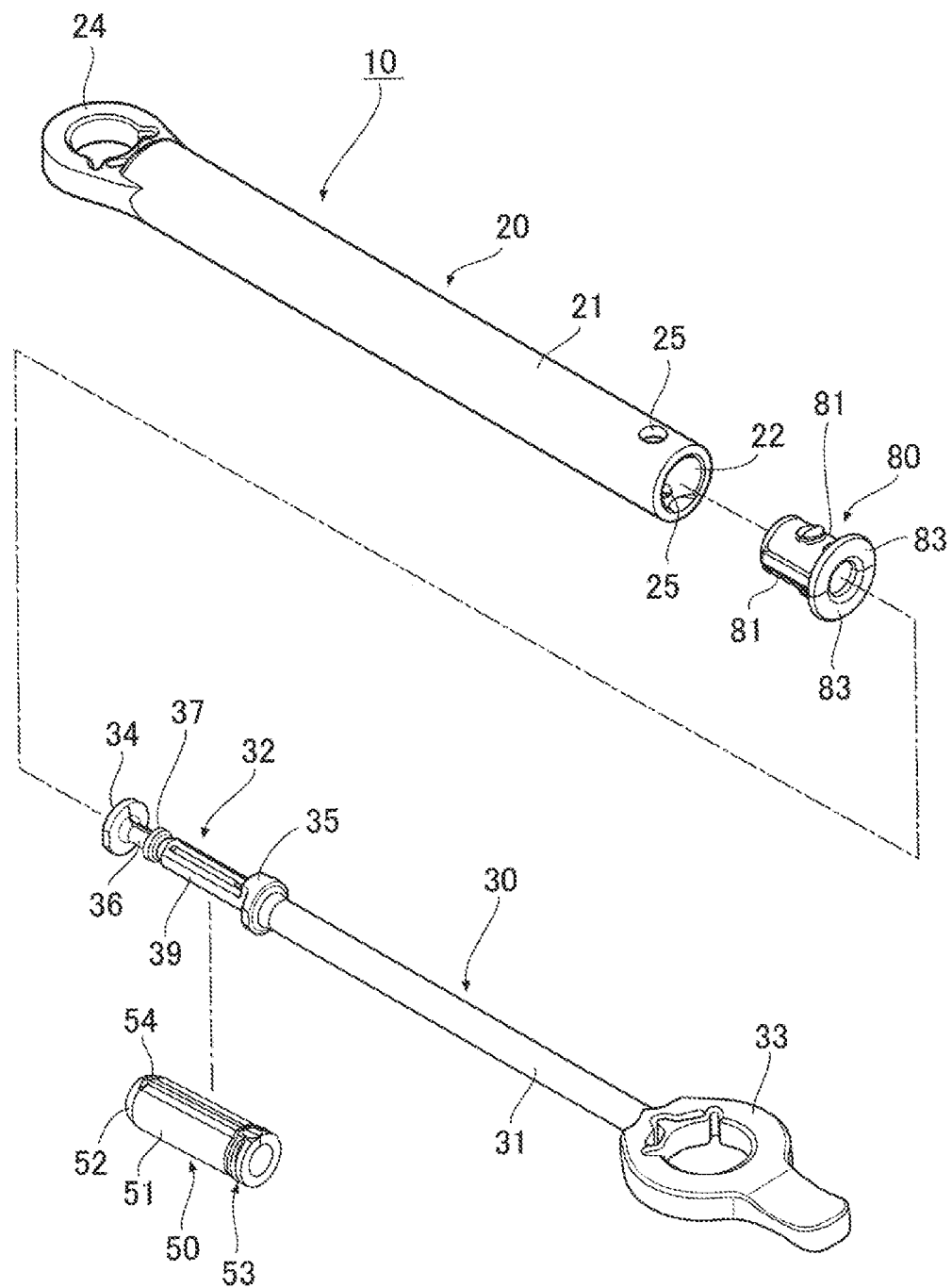
FIG. 1 is an exploded perspective view of a damper according to a first embodiment of the present invention.

A damper 10 shown in FIG. 1 is attached to a pair of members that are close to and away from each other, and applies a braking force when the pair of members are close to or away from each other. The damper 10 can be used for braking, for example, a glove box or a lid that is openably and closably attached to an opening of an accommodation portion provided in an instrument panel of an automobile. In the following embodiment, one member is described as a fixed body such as the accommodation portion of the instrument panel, and the other member is described as an opening and closing body such as the glove box or the lid that is openably and closably attached to the opening of the fixed body. However, the pair of members is not particularly limited as long as they can be close to and away from each other.

As shown in FIG. 1, the damper 10 in this embodiment mainly includes a cylinder 20 having a substantially cylindrical shape, a rod 30 movably inserted into the cylinder 20, a piston 50 formed of an elastic resin material and mounted on an axial tip end side of the rod 30, and a cap 80 attached to an opening 22 of the cylinder 20.

Figure 8:
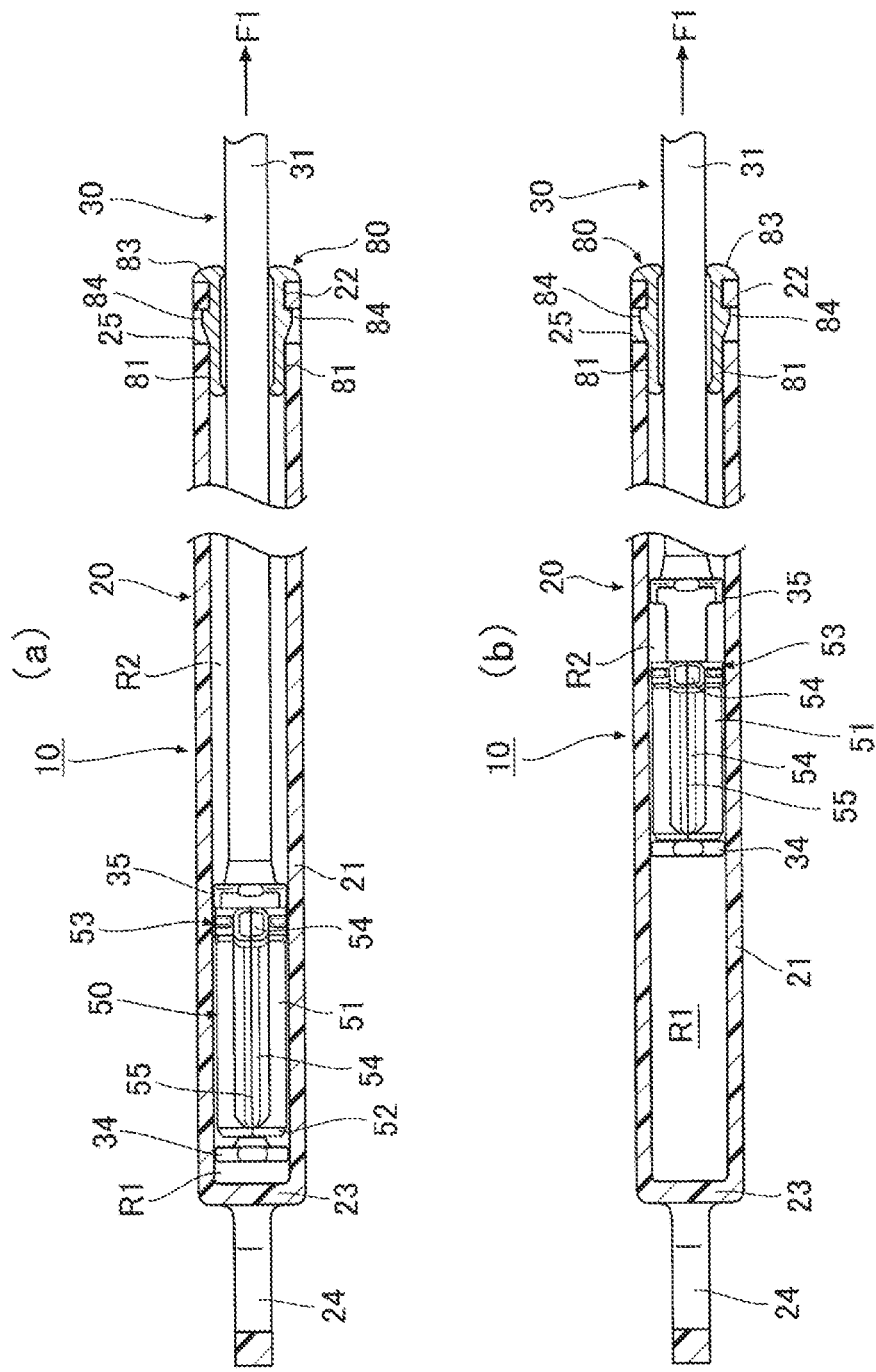
FIG. 8 shows a usage state of the damper. (a) of FIG. 8 is an explanatory view when the rod is stationary, and (b) of FIG. 8 is an explanatory view when a damper braking force is applied.

As shown in FIGS. 1 and 8, the cylinder 20 in this embodiment has a substantially cylindrical wall portion 21 extending in a predetermined length, and an axial one end side thereof is opened to form the opening 22. The other end side of the wall portion 21 is closed by an end wall 23. An annular attachment portion 24 is provided outside the end wall 23, and the cylinder 20 can attached to one member such as the instrument panel via the attachment portion 24. On one end side of the wall portion 21, circular fitting holes 25, 25 are formed to face each other in a circumferential direction (see FIG. 1). A cap provided with an orifice may be mounted by opening the other end side of the wall portion 21, and an attachment portion may be provided at a predetermined axial position on an outer circumference of the wall portion 21. An outer diameter of the cylinder 20 is preferably 12 mm or less, and more preferably 8 mm or less.

As shown in (a) and (b) of FIG. 7, the cap 80 in this embodiment includes a pair of half-divided bodies 81, 81 each having a half cylindrical shape, which are integrated by being engaged with each other via a locking piece 88 and a locked portion 90 to be locked thereto. Each half-divided body 81 is provided with a flange portion 83 on an outer circumference of a base end thereof, and a fitting protrusion 84 protruding from the outer circumference in an axially intermediate position. As the cap 80 is inserted into the opening 22 of the cylinder 20 from a tip end side of the cap 80, the flange portions 83 are locked to a base end surface of the cylinder 20, and the fitting protrusions 84 are fitted into the fitting holes 25, 25 of the cylinder 20, whereby the cap 80 is mounted on a base end side of the cylinder 20 (see FIGS. 8 and 9).

Figure 11:
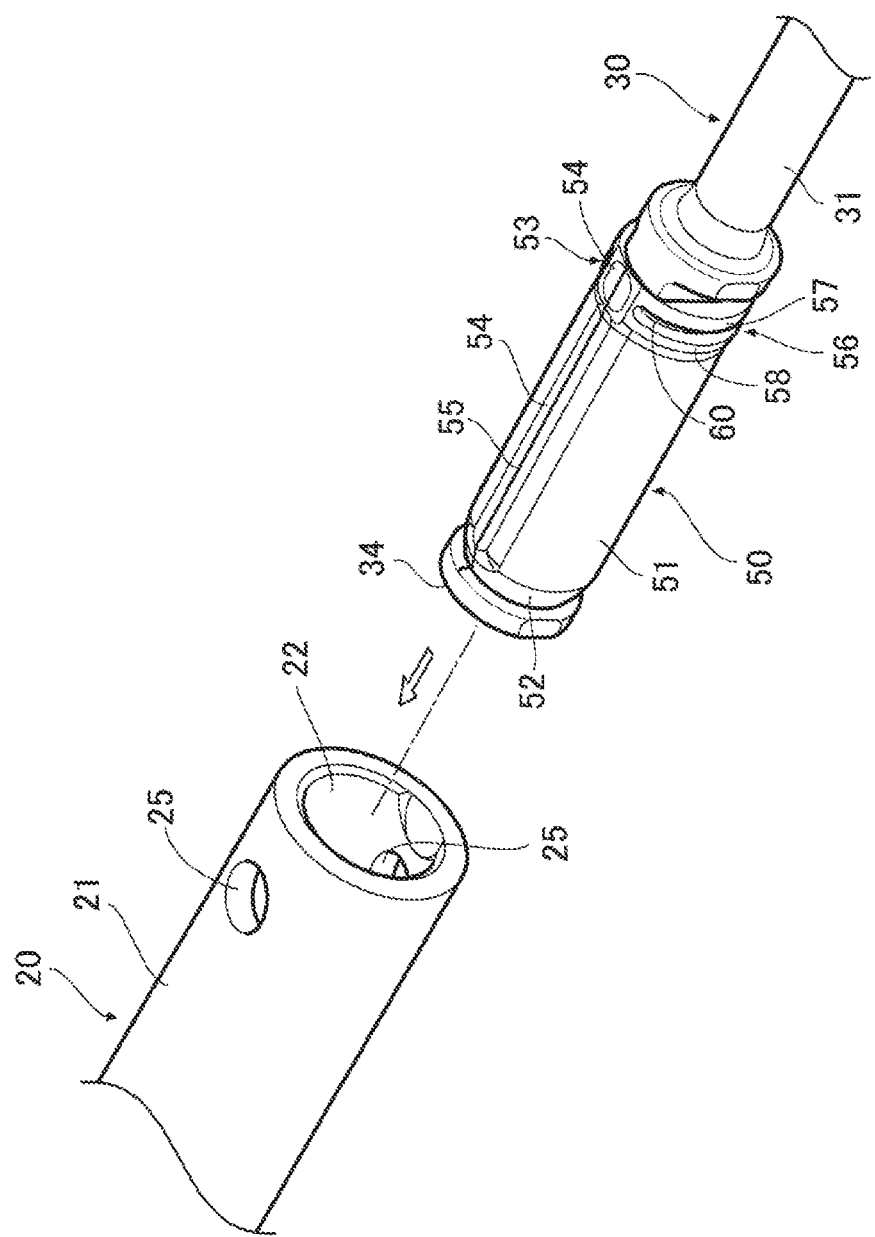
FIG. 11 is a perspective view showing a state in which the rod on which the piston is mounted is inserted into a cylinder when the damper is assembled.

As shown in FIG. 11, the rod 30 is movably inserted into the cylinder 20 from the tip end side of the rod 30 through the opening 22 of the cylinder 20, and includes a columnar shaft portion 31 and a piston mounting portion 32 that is connected to a tip end side of the shaft portion 31 and on which the piston 50 is mounted. An annular attachment portion 33 is provided on a base end side of the shaft portion 31, and the rod 30 is attached to the other member such as the glove box via the attachment portion 33.

Figure 2:
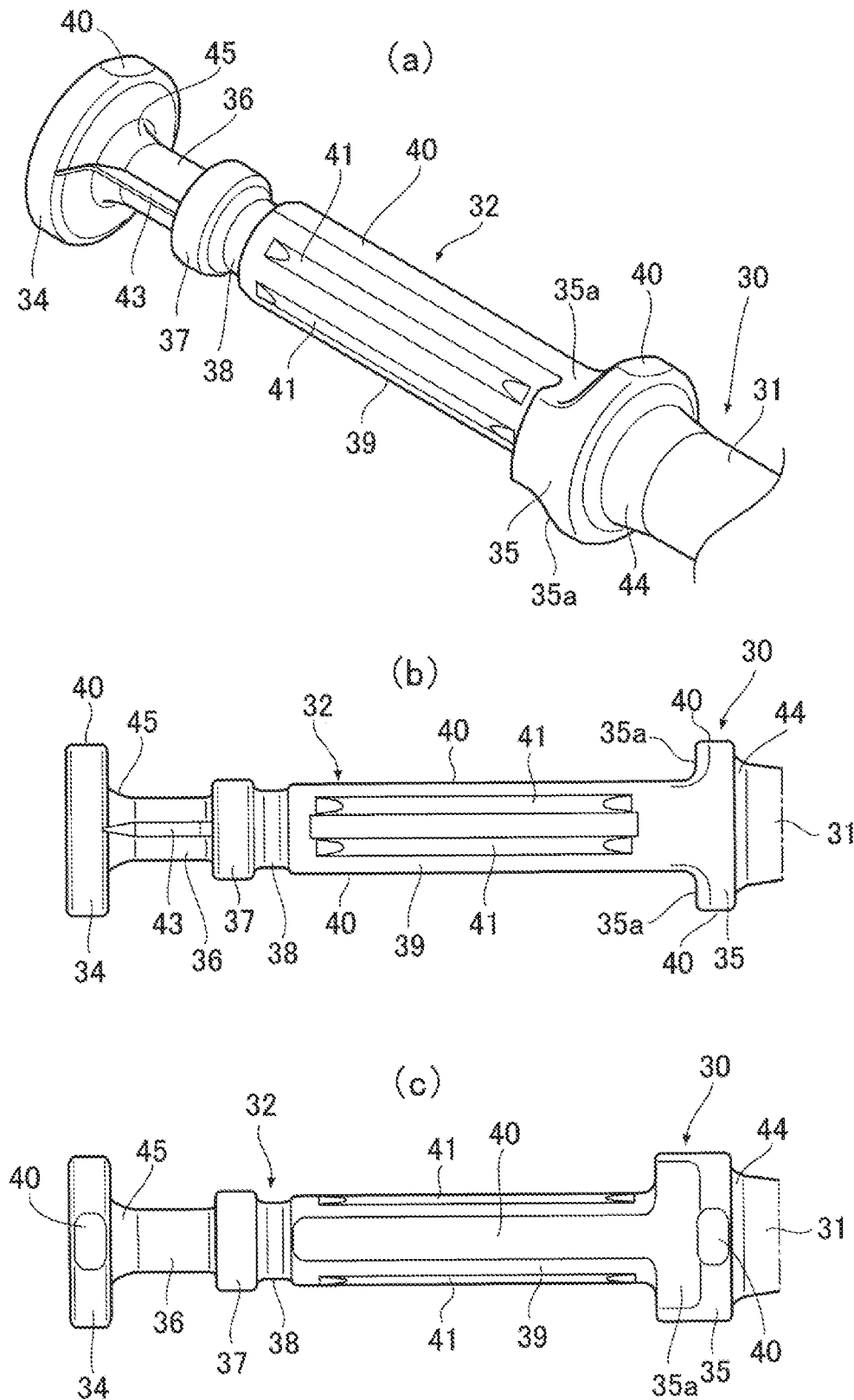
FIG. 2 shows a rod constituting the damper. (a) of FIG. 2 is a perspective view thereof, (b) of FIG. 2 is a plan view, and (c) of FIG. 2 is a side view.

With reference to (a) to (c) of FIG. 2, the piston mounting portion 32 is provided at an axial tip end of the rod 30, and includes a first engaging portion 34 having a substantially disc shape and a stopper portion 35 provided at a predetermined interval on a rod base end side with respect to the first engaging portion 34 and having a substantially circular protrusion shape.

When the rod 30 moves in a braking direction in which the damper applies the braking force, the first engaging portion 34 is a portion engaged with the piston 50 as shown in FIGS. 14 to 17 (here, the first engaging portion 34 is engaged with the other end side of the piston 50). That is, the first engaging portion 34 forms an "engaging portion" in the present invention. The damper braking direction in this embodiment means a direction in which the first engaging portion 34 is away from the end wall 23 of the cylinder 20 and an extraction amount of the rod 30 from the opening 22 of the cylinder 20 increases (see an arrow F1 in FIGS. 8 and 13).

The stopper portion 35 has the substantially circular protrusion shape as a whole, and cut portions 35a, 35a formed by cutting a wall portion are respectively formed at positions on both sides in a circumferential direction of the stopper portion 35 and on a first engaging portion 34 side. Each cut portion 35a is provided with a flat surface continuous with a flat surface 40 provided in the second column portion 39 described below (see (a) of FIG. 2). Outer diameters of the first engaging portion 34 and the stopper portion 35 is larger than an inner diameter of the piston 50. A distance between the first engaging portion 34 and the stopper portion 35 is longer than an axial length of the piston 50. The piston 50 is mounted between the first engaging portion 34 and the stopper portion 35 so as to be capable of extending and compressing axially.

The piston mounting portion 32 further includes a substantially columnar first column portion 36 extending from an inner surface side of the first engaging portion 34 toward the rod base end side, a second engaging portion 37 having a substantially circular protrusion shape continuous with a tip end of the first column portion 36 in an extending direction and engaged with the piston 50 when the rod 30 moves in a returning direction opposite to the damper braking direction (see an arrow F2 in FIGS. 18 to 22), and a second column portion 39 extending from a base end side of the second engaging portion 37 to the rod base end side via a recess 38, connected to the stopper portion 35 and having a substantially columnar shape.

The returning direction opposite to the damper braking direction in this embodiment (hereinafter, also simply referred to as the "returning direction") means that the rod 30 moves in a direction in which the first engaging portion 34 is close to the end wall 23 of the cylinder 20 and a pushing amount of the rod 30 into the cylinder 20 increases (see the arrow F2 in FIGS. 9 and 18 to 22).

Figure 10:
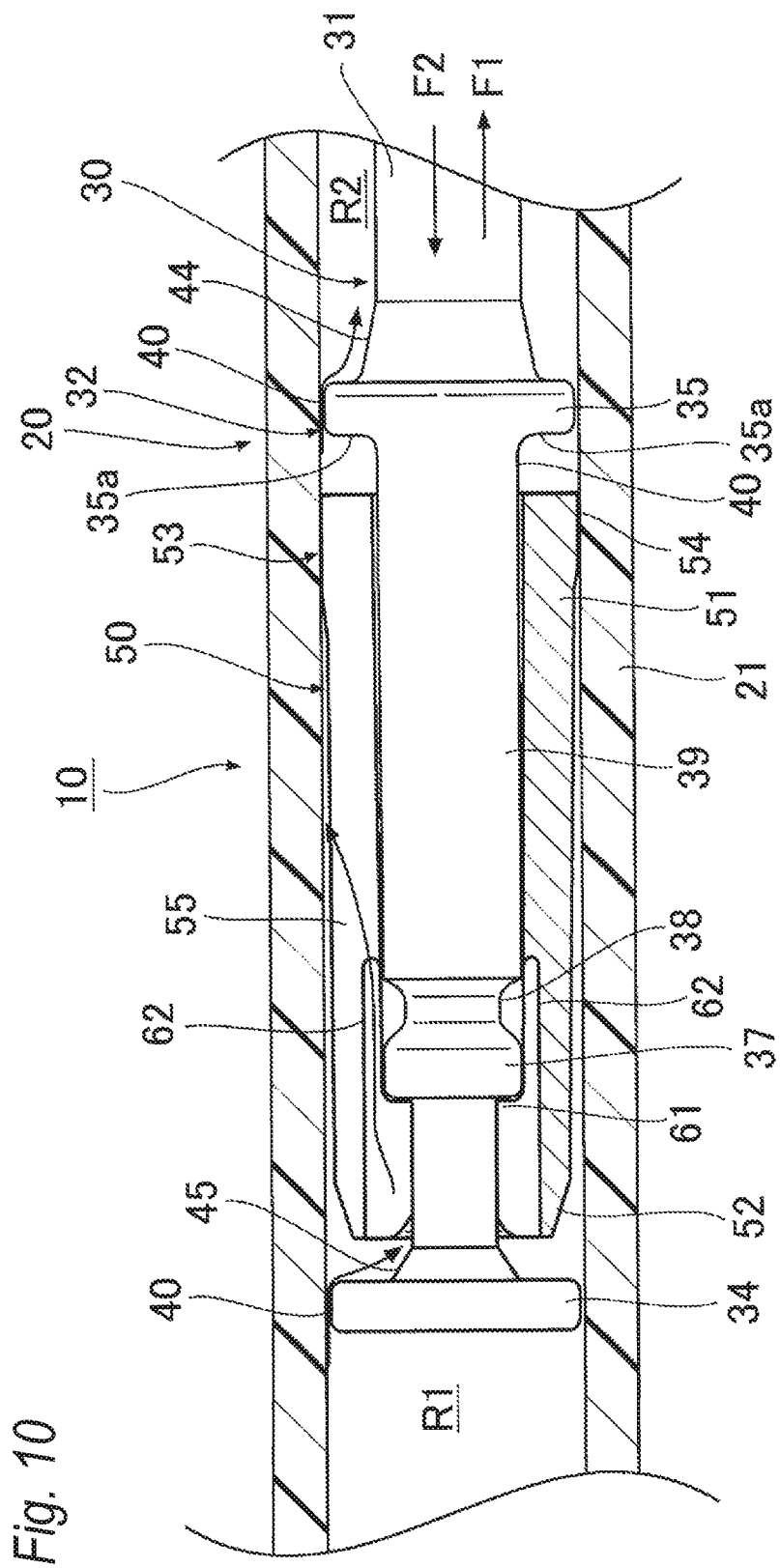
FIG. 10 is an enlarged explanatory view of a main part of the damper.

As shown in FIG. 10, (a) of FIG. 18, (a) of FIG. 19, (a) of FIG. 20, (a) of FIG. 21 and (a) of FIG. 22, the second engaging portion 37 is arranged on a damper returning direction side with respect to a convex portion 53 described below of the piston 50. The second engaging portion 37 and the second column portion 39 are larger in diameter than the first column portion 36 and smaller in diameter than the first engaging portion 34 and the stopper portion 35, and the second column portion 39 is formed longer than the first column portion 36.

In this embodiment, as shown in (a) of FIG. 18, (a) of FIG. 19, (a) of FIG. 20, (a) of FIG. 21 and (a) of FIG. 22, when the rod 30 moves in the damper returning direction, the second engaging portion 37 is engaged with an engaged portion 61 described below of the piston 50. When the rod 30 further moves in the damper returning direction from a state shown in FIG. 15, the piston 50 axially compressed and in pressure contact with an inner circumference of the cylinder elastically returns to an extended state (see FIGS. 19 to 22). However, as shown in FIG. 22, when the piston 50 is extended the longest, the stopper portion 35 is engaged with the other end side of the piston 50 to restrict extension of the piston 50.

As shown in (a) of FIG. 2, flat surfaces 40, 40 each cut in a planar shape axially along the rod 30 are formed parallel to each other on an outer circumference of each of the first engaging portion 34, the stopper portion 35, the first column portion 36 and the second column portion 39 at two circumferential positions thereof. The flat surface 40 formed on the second column portion 39 is flush with the flat surface of each of the cut portions 35a, 35a provided in the stopper portion 35. A gap is formed with respect to the inner circumference of the cylinder 20 and an inner circumference of the piston 50 by the flat surface 40.

As shown in (a) of FIG. 2, a plurality of protrusions 41 that abut against the inner circumference of the piston 50 are formed to extend axially and at predetermined intervals in a circumferential direction, on an outer circumference of the rod 30 on a side of the second engaging portion 37 in a damper braking direction. Specifically, in this embodiment, as shown in (c) of FIG. 2, on both sides of the flat surface 40 in the circumferential direction on the outer circumference of the second column portion 39, protrusions 41, 41 extending axially along the rod 30 protrude from a tip end portion of the rod 30 near the second engaging portion 37 in a length reaching a front portion of the stopper portion 35 (in this embodiment, four protrusions 41 are provided in total). A gap is formed between the inner circumference of the piston 50 and the outer circumference of the second column portion 39 by the protrusions 41.

As shown in (a) and (b) of FIG. 2, a groove 43 is formed at a predetermined depth from one circumferential position on an inner surface of the first engaging portion 34 to extend axially along the first column portion 36. As shown in (b) of FIG. 2, the groove 43 is provided between the flat surfaces 40, 40 provided in the first engaging portion 34 and at an intermediate position therebetween. As shown in (a) of FIG. 14, (a) of FIG. 15, (a) of FIG. 16 and (a) of FIG. 17, with the groove 43, even when the other end surface of the piston 50 abuts against the inner surface of the first engaging portion 34, a gap can be ensured between the inner surface of the first engaging portion 34 and the other end surface of the piston 50, and a gap can be ensured between an outer circumference of the first column portion 36 and an inner circumference of the engaged portion 61 of the piston 50 (see (c) of FIG. 4).

An inclined portion 44 whose diameter is gradually reduced toward a base end side of the rod 30 is formed on an outer circumference of the shaft portion 31 on a tip end side thereof, that is, an outer circumference of the connecting portion between the shaft portion 31 and the stopper portion 35. An inclined portion 45 whose diameter is gradually reduced toward the base end side of the rod 30 is also formed on the outer circumference of the first column portion 36 on a tip end side thereof.

Figure 9:
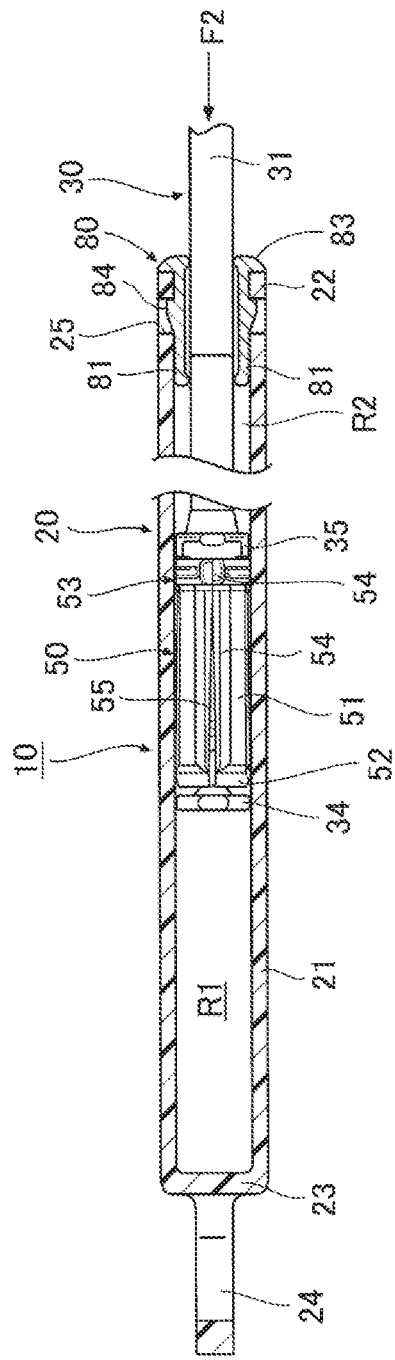
FIG. 9 shows a usage state of the damper, and is an explanatory view when the damper braking force is released.

As described above, the rod 30 having the above structure is inserted into the cylinder 20 from the first engaging portion 34 side at the tip end thereof and is movably arranged in the cylinder 20. However, at this time, as shown in FIGS. 8 and 9, with the first engaging portion 34 of the rod 30 as a boundary, a first chamber R1 of the rod 30 located on the damper returning direction side and a second chamber R2 of the rod 30 located on the damper braking direction side are formed. In this embodiment, the first chamber R1 is formed on an end wall 23 side of the cylinder 20, and the second chamber R2 is formed on an opening 22 side of the cylinder 20. In the rod 30 described above, the shaft portion 31, the attachment portion 33, the first engaging portion 34, the stopper portion 35, the second engaging portion 37, as well as the first column portion 36, the second column portion 39, the plurality of protrusions 41 and the like are all formed integrally.

Next, with reference to FIGS. 3 to 6, a piston 50 formed of the elastic resin material, which extends axially along the rod 30 in a predetermined length and is mounted on a base end side of the first engaging portion 34 of the rod 30 so as to surround the rod 30, will be described. The piston 50 is formed of, for example, a rubber elastic material such as rubber or elastomer, or a resin material such as sponge. A diameter of the piston 50 is increased when the piston 50 is axially compressed, and is reduced when the piston 50 is axially extended. The piston 50 follows movement of the rod 30 to move in the damper braking direction when the rod 30 moves in the damper braking direction, and follows movement of the rod 30 to move in the damper returning direction when the rod 30 moves in the damper returning direction.

The piston 50 in this embodiment includes: a main body 51 extending in a predetermined length so as to form a substantially cylindrical shape, and whose outer circumference is formed in a circular shape; and a convex portion (also called a "pressure contact portion") 53 provided at a predetermined axial position of the main body 51, that is, on an axial one end side of the main body 51 so as to protrude outward in the radial direction, and always in pressure contact with the inner circumference of the cylinder 20.

The main body 51 in this embodiment extends in the predetermined length so as to form the substantially cylindrical shape, and the outer circumference thereof is formed in the circular shape. An outer circumference of the other end portion 52 (an end portion located on the first engaging portion 34 side when the piston 50 is mounted on the rod 30) of the main body 51 on a side opposite to the damper braking direction (the damper returning direction side) is tapered such that a diameter thereof is gradually reduced toward an axial the other end surface of the main body 51. The piston 50 further includes an engaged portion 61 that is engaged with the rod 30 when the piston 50 moves in the returning direction on a side opposite to the damper braking direction.

The convex portion 53 is provided on an outer circumference of one end portion (an end portion located on a stopper portion 35 side when the piston 50 is mounted on the rod 30) of the main body 51 on the damper braking direction side, is always in pressure contact with the inner circumference of the cylinder 20 except for a cutout portion 54 described below, and applies the braking force to the piston 50 when the rod 30 moves (both in the damper braking direction and the damper returning direction).

In the following description, one end portion or one end of the piston on the damper braking direction side will be simply referred to as "one end portion" or "one end", and the other end portion or the other end thereof on the side opposite to the damper braking direction (the damper returning direction side) will be simply referred to as "the other end portion" or "the other end".

Figure 4:
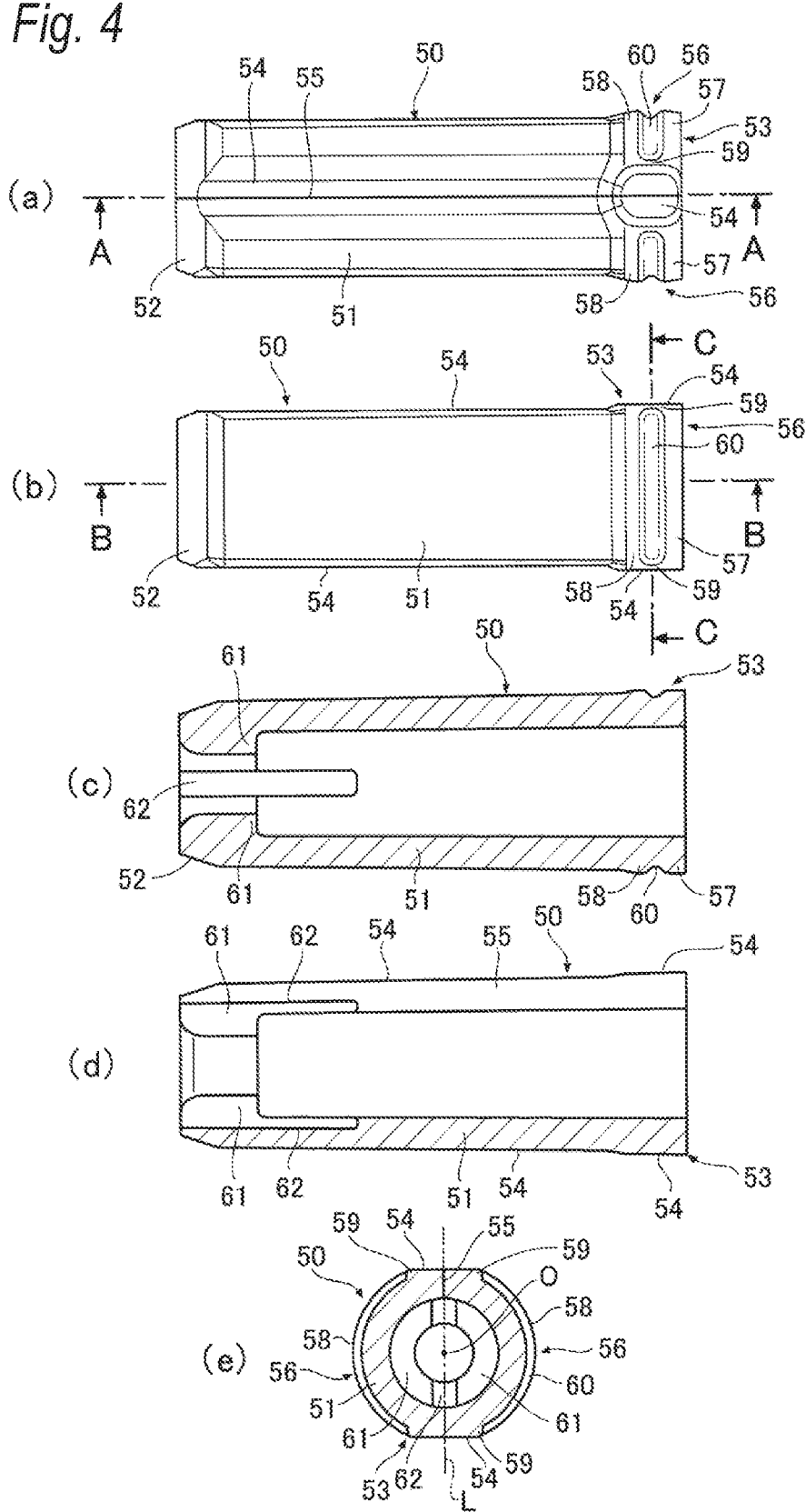
FIG. 4 shows the piston constituting the damper. (a) of FIG. 4 is a plan view, (b) of FIG. 4 is a side view, (c) of FIG. 4 is a sectional view taken along line A-A in (a) of FIG. 4, (d) of FIG. 4 is a sectional view taken along line B-B in (b) of FIG. 4, and (e) of FIG. 4 is a sectional view taken along line C-C in (b) of FIG. 4.

As shown in (a) to (d) of FIG. 4, an outer circumference of the piston 50 has a tapered shape whose diameter is increased from the other end side toward one end side of the piston 50. In this embodiment, the outer circumference of the main body 51 constituting the piston 50 is formed in the tapered shape whose diameter is gradually increased from one end side of the tapered the other end portion 52 toward the convex portion 53.

The cutout portion 54 extending axially is formed on the outer circumference of the main body 51 from one end side of the tapered the other end portion 52. The cutout portion 54 forms an air escape path between the inner circumference of the cylinder and the outer circumference of the piston (the main body 51 and the convex portion 53) to facilitate deformation of extending and compressing the piston 50, and to adjust the damper braking force by the piston 50. As shown in (e) of FIG. 4, when the piston 50 is viewed axially, the cutout portion 54 has a shape obtained by cutting a part of the circular shape of the outer circumference of the main body 51 with one plane, and is formed at two circumferential positions of the main body 51 so as to be parallel to each other. As shown in FIG. 3, the cutout portion 54 in this embodiment is formed so as to extend axially through the convex portion 53 to one end of the main body 51. By providing such a cutout portion 54, a gap is formed between an outer circumferential portion from the convex portion 53 of the main body 51 to the other end side, and the inner circumference of the cylinder 20 when the damper braking force does not act. By forming the cutout portion 54 in the convex portion 53, the cutout portion 54 in the convex portion 53 is not in close contact with the inner circumference of the cylinder 20 and forms a gap with the inner circumference of the cylinder 20, whether the rod 30 or the piston 50 is stationary, damper braking is being performed, or the damper braking is released.

The cutout portion 54 in this embodiment is formed from one end side of the other end portion 52 of the main body 51 to one end of the main body 51, but may be formed from the other end to one end of the main body 51 when the other end portion 52 of the main body 51 is not tapered. However, the cutout portion may be formed from the other end of the main body 51 to an axially intermediate position, or may be provided only in the convex portion 53 on the one end side of the main body 51 without being formed on the outer circumference of the main body 51. That is, the cutout portion may be formed at least partway from one end to the other end side, or may be formed at least partway from the other end to one end side.

As shown in (a) and (b) of FIG. 3, the convex portion 53 in this embodiment includes a pair of annular convex portions 56, 56 protruding outward in the radial direction of the main body 51 of the piston 50 and extending in an elongated shape along the circumferential direction of the main body 51. The pair of annular convex portions 56, 56 are arranged on the outer circumference of one end portion of the main body 51 and between cutout portions 54, 54 provided at two circumferential positions of the convex portion 53 (see (e) of FIG. 4). Specifically, the convex portion 53 includes: a plurality of first convex portions 57, 58 extending along the circumferential direction of the main body 51 and juxtaposed in an axial direction of the main body 51; and a second convex portion 59 forming the annular convex portion 56 in cooperation with the first convex portions 57, 58 by connecting predetermined circumferential positions of adjacent first convex portions 57, 58 to each other. That is, the convex portion 53 includes the annular convex portion 56 including: the plurality of first convex portions 57, 58 extending along the circumferential direction of the main body 51; and the second convex portion 59 arranged to intersect with the first convex portions 57, 58 so as to connect both circumferential ends of the plurality of first convex portions 57, 58 to each other.

More specifically, the annular convex portion 56 is arranged on the outer circumference of one end of the main body 51, and forms an annular shape as a whole that extends in the elongated shape along the circumferential direction of the main body 51. The annular convex portion 56 includes: the first convex portion 57 extending along the circumferential direction of the main body 51; another first convex portion 58 arranged in parallel to the first convex portion 57 on the other end side of the piston 50 at a predetermined interval and extending along the circumferential direction of the main body 51; and second convex portions 59, 59 extending axially along the main body 51 and arranged orthogonal to the first convex portions 57, 58, and connecting both circumferential ends of the pair of first convex portions 57, 58 adjacent to each other in the axial direction of the main body 51 to each other.

A recess 60, which is surrounded by convex portions 57, 58, 59 constituting the annular convex portion 56 and has a concave groove shape having a predetermined depth, is formed to extend along the circumferential direction of the main body 51 at the predetermined depth inside the convex portions 57, 58, 59. The outermost diameter of the convex portions 57, 58, 59 is formed to be larger than an inner diameter of the cylinder 20, and the convex portions 57, 58, 59 are always in pressure contact with the inner circumference of the cylinder 20.

As shown in (a) to (d) of FIG. 4, the engaged portion 61 protruding annularly along the circumferential direction of the main body 51 is provided on an inner circumference of the other end side of the main body 51. As described above, the engaged portion 61 is arranged on the damper returning direction side with respect to the convex portion 53 provided in the piston 50. As shown by the arrow F2 in FIG. 9, when the rod 30 moves in the damper returning direction, the engaged portion 61 is engaged with the second engaging portion 37 of the rod 30 as shown in (a) of FIG. 18, (a) of FIG. 19, (a) of FIG. 20, (a) of FIG. 21 and (a) of FIG. 22 (see (a) of FIG. 14). At this time, as shown in (b) of FIG. 14, a gap is formed between the first engaging portion 34 of the rod 30 and the other end of the piston 50. At this time, the gap is formed between the first engaging portion 34 of the rod 30 and the other end of the piston 50 (see (b) of FIG. 18, (b) of FIG. 19, (b) of FIG. 20, (b) of FIG. 21 and (b) of FIG. 22).

When the piston 50 is inserted in the inner circumference of the cylinder 20, the annular convex portion 56 of the convex portion 53 is in close contact with the inner circumference of the cylinder 20. Thereby, as shown in (b) of FIG. 12, a sealed space R3 is formed inside thereof, that is, between the inner circumference of the cylinder 20, and the convex portions 57, 58, 59 constituting the annular convex portion 56 and the recess 60.

Figure 12:
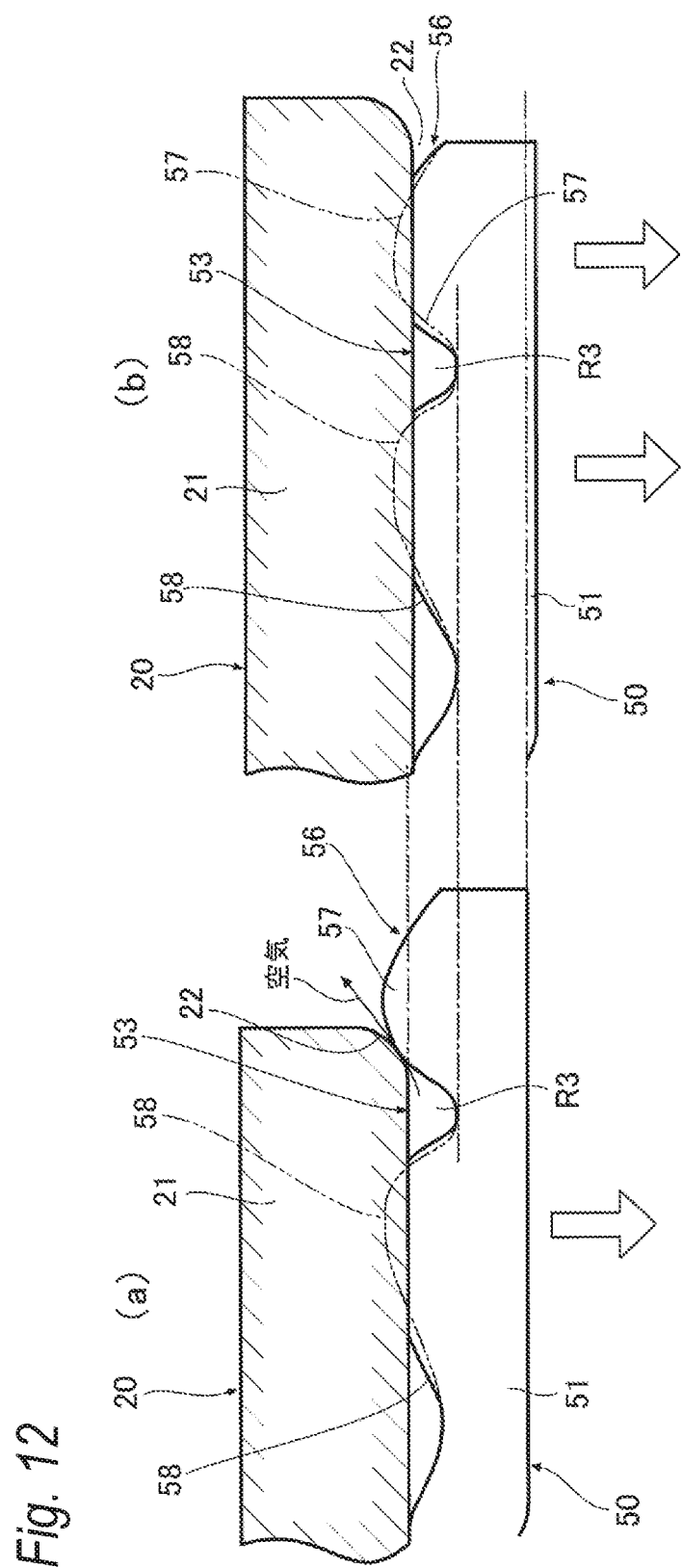
FIG. 12 shows deformed states of a plurality of first convex portions constituting an annular convex portion in the state shown in FIG. 11. (a) of FIG. 12 is an explanatory view showing a deformed state of a pressure contact portion when one first convex portion is inserted into the cylinder and another first convex portion abuts against an inner circumference of an opening of the cylinder, and (b) of FIG. 12 is an explanatory view showing a deformed state of the pressure contact portion when another first convex portion is also completely inserted into the cylinder from the state of (a) of FIG. 12.

In this way, the recess 60 surrounded by the convex portions 57, 58, 59 is provided inside the annular convex portion 56 to form the sealed space R3 as shown in (b) of FIG. 12 with the inner circumference of the cylinder 20, whereby when the piston 50 is inserted into the cylinder 20 and the convex portion 53 is in pressure contact with the inner circumference of the cylinder 20, the convex portion 53 has an adsorption effect on the inner circumference of the cylinder 20.

That is, when the piston 50 is inserted from the other end portion 52 side into the cylinder 20 through the opening 22, of the first convex portions 57, 58 juxtaposed axially to constitute the annular convex portion 56, the first convex portion 58 on the other end portion 52 side is first pressed against the inner circumference of the cylinder 20, an initial shape shown by a two-dot chain line in (a) of FIG. 12 is crushed as shown by a solid line and is inserted while being bent and deformed, and air in the recess 60 is pushed out at the same time. Thereafter, the first convex portion 57 on one end side of the piston 50 is in close contact with the inner circumference of the cylinder 20 to form the sealed space R3. When the piston 50 is further pushed in, the first convex portion 57 is strongly crushed by the inner circumference of the cylinder 20, and the first convex portions 57, 58 are deformed as shown by a solid line in (b) of FIG. 12, so that the sealed space R3 is also crushed to reduce a volume thereof. In this way, when the crushed and deformed first convex portions 57, 58 attempt to return to an original shape as shown by a two-dot chain line in (b) of FIG. 12, the crushed sealed space R3 is slightly widened and depressurized, so that the convex portion 53 is adsorbed to the inner circumference of the cylinder 20.

Lap area of the first convex portion 58 with the inner circumference of the cylinder 20 shown by the two-dot chain line in (a) of FIG. 12 is the same as lap area of the first convex portion 58 and the first convex portion 57 with the inner circumference of the cylinder 20 shown by the two-dot chain line in (b) of FIG. 12. However, an amount of bending deformation of the convex portion 53 inward of the piston when the pair of first convex portions 57, 58 are both inserted into the cylinder 20 as shown in (b) of FIG. 12 is larger than an amount of bending deformation of the convex portion 53 inward of the piston when only the first convex portion 58 on the other end side of the piston 50 is inserted into the cylinder 20 as shown in (a) of FIG. 12.

A plurality of the annular convex portions 56 are arranged along the circumferential direction of the outer circumference of the piston 50. In this embodiment, as shown in (e) of FIG. 4, when the piston 50 is viewed axially, the annular convex portions 56 are formed in a pair arranged at two corresponding circumferential positions of convex portion 53. More specifically, the annular convex portions 56 are formed in the same annular convex shape having the same circumferential length and having the same axial length, and the pair of annular convex portions 56, 56 are arranged so as to be line-symmetric with respect to a line segment L passing through a center O of the main body 51 of the piston 50 (see (e) of FIG. 4). Three or more annular convex portions may be arranged along the circumferential direction of the outer circumference of the piston 50, and the number of the annular convex portions is not particularly limited.

The damper 10 is further provided with the cutout portions 54, 54 each having the shape obtained by cutting a part of the circular shape of the main body 51 having the circular shape with one plane, between the second convex portion 59 forming one annular convex portion 56, and another second convex portion 59 adjacent to the second convex portion 59 in the circumferential direction of the main body 51 and forming another annular convex portion 56. Specifically, between the second convex portion 59 of one annular convex portion 56 and the second convex portion 59 of the other annular convex portion 56 of the convex portion 53, the cutout portions 54, 54 each having the shape obtained by cutting a part of the circular shape of the main body 51 with one plane when the piston 50 is viewed axially as shown in (e) of FIG. 4, are formed at two circumferential positions of the convex portion 53 so as to be parallel to each other. That is, the cutout portion 54, 54 in this embodiment are formed in a pair provided between the pair of annular convex portions 56, 56, and are arranged so as to be orthogonal to the pair of annular convex portions 56, 56 when the piston 50 is viewed axially (see (e) of FIG. 4).

The cutout portion 54 forms the air escape path between the inner circumference of the cylinder and the outer circumference of the piston (the main body 51 and the convex portion 53) to facilitate deformation of extending and compressing the piston 50, and to adjust the damper braking force by the piston 50. The pair of annular convex portions 56, 56 constituting the convex portion 53 are in close contact with the inner circumference of the cylinder 20, while the cutout portions 54, 54 are not in close contact with the inner circumference of the cylinder 20 and form the gap with the inner circumference of the cylinder 20, whether the rod 30 or piston 50 is stationary, the damper braking is being performed, or the damper braking is released.

The cutout portions 54 provided in the convex portion 53 extend toward the other end of the main body 51 in the damper returning direction, and in this embodiment, extends to the tapered the other end portion 52 of the main body 51. The cutout portions 54 are formed at two circumferential positions of the main body 51 so as to be parallel to each other. By providing such a cutout portion 54, the gap is formed between the outer circumferential portion from the convex portion 53 of the main body 51 to the other end side, and the inner circumference of the cylinder 20 when the damper braking force does not act.

The cutout portion 54 in this embodiment is formed from the convex portion 53 of the main body 51 to the other end portion 52 of the main body 51, but may be formed from the convex portion 53 to the other end of the main body 51 when the other end portion 52 of the main body 51 is not tapered. However, the cutout portion may be formed from the other end of the main body 51 to an axially intermediate position, or may be provided only in the convex portion 53 on the other end side of the main body 51 without being formed on the outer circumference of the main body 51. That is, the cutout portion may be formed at least partway from one end to the other end side, or may be formed at least partway from the other end to one end side. Further, the cutout portion 54 may be provided at a position of the main body 51 other than the convex portion 53, instead of being provided in the convex portion 53.

The annular convex portion described above may have the annular shape including the plurality of first convex portions and the second convex portion connecting the predetermined circumferential portions of the first convex portions, and for example, three or more first convex portions may be juxtaposed, or three or more second convex portions may be provided. In short, any shape may be used as long as the first convex portion and the second convex portion cooperate to form the annular convex portion, the recess is formed between the first convex portion and the second convex portion, and the sealed space is formed with the inner circumference of the cylinder.

As shown in (b) of FIG. 3 and (c) and (d) of FIG. 4, air flow grooves 62, 62 each having a concave groove shape extending axially from the other end of the main body 51 toward one end side are formed at positions of the inner circumference of the main body 51 corresponding to the pair of cutout portions 54, 54. As shown in FIG. 10, the air flow groove 62 is formed in a length from the other end of the main body 51 to one end of the second column portion 39 beyond the second engaging portion 37 and the recess 38 of the rod 30. The air flow groove 62 forms a gap with the first column portion 36, the second engaging portion 37 and the outer circumference of one end side of the second column portion 39 of the rod 30 to allow air to flow between the rod 30 and the piston 50. The air flow groove may be formed between the outer circumference of the rod 30 and the inner circumference of the piston 50, and may be formed on an outer circumferential side of the rod, for example.

As shown in FIG. 3 and (a) of FIG. 4, a slit 55 is formed over the entire axial direction of the piston 50 from the other end to one end of the piston 50, in one cutout portion 54 provided on the outer circumference of the main body 51. As shown in (d) and (e) of FIG. 4, the slit 55 communicates with one air flow groove 62 of the pair of air flow grooves 62, 62 formed on the inner circumference of the piston 50. The slit 55 is configured to be closed since inside of the air flow groove 62 is depressurized when the piston 50 moves in the damper braking direction (see FIG. 8), and to be opened by being pushed by the air flowing in from the air flow groove 62 when the piston 50 moves in the damper returning direction (see FIGS. 5 and 9).

Since the main body 51 can be separated into two along the axial direction by the slit 55 provided in the main body 51, the piston 50 can be mounted on the piston mounting portion 32 from an outer diameter side of the rod 30. The slit 55 may not be formed over the entire axial direction from the other end to one end of the main body 51, and may be formed in a length to an axially intermediate position from the other end of the main body 51 toward one end side.

When the rod 30 and the piston 50 are stationary without moving in the damper braking direction or the returning direction, that is, in a normal state where the piston 50 is not extended or compressed, as shown in FIG. 10, a gap is formed between the first engaging portion 34 of the rod 30 and the other end of the piston 50, and a gap is formed between the stopper portion 35 of the rod 30 and one end of the piston 50 by the cut portion 35a provided in the stopper portion 35.

Figure 6:
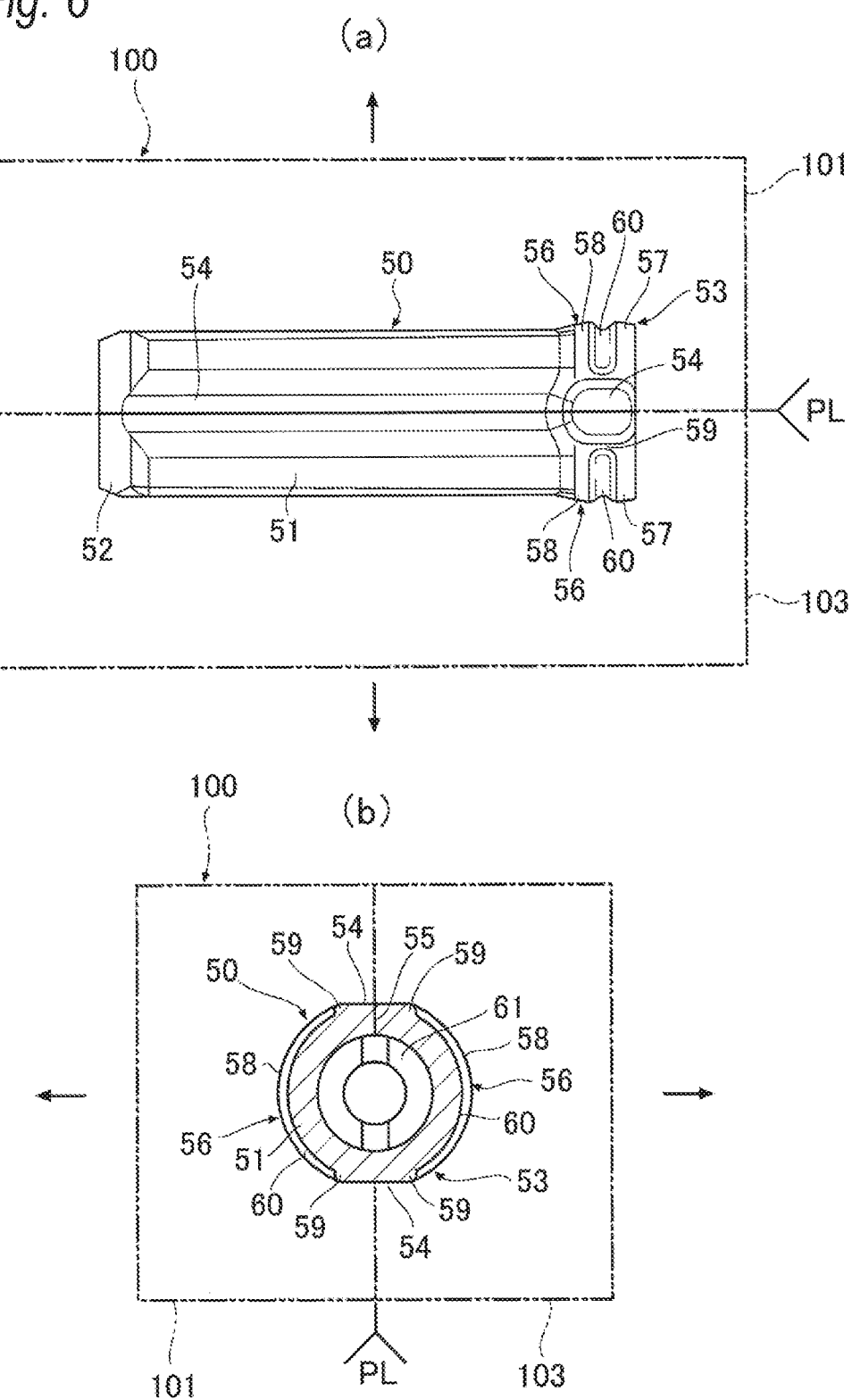
FIG. 6 shows a mold structure for molding the piston constituting the damper. (a) of FIG. 6 is a plan view, and (b) of FIG. 6 is a front view.

The piston 50 having the above structure can be formed, for example, by the split mold 100 as shown in (a) and (b) of FIG. 6. The split mold 100 includes a pair of molds 101, 103 that can be close to and away from each other, and a parting line PL thereof, that is, surfaces that abut against each other when the pair of molds 101, 103 is closed, is provided so as to be located in the pair of cutout portions 54, 54 of the piston 50 (see (a) and (b) of FIG. 6).

In the damper 10 configured as described above, during the damper braking, the first engaging portion 34 of the rod 30 abuts against the other end portion 52 of the piston 50, and the axial compression force acts on the piston 50 between the first engaging portion 34 and the annular convex portions 56, 56 of the convex portion 53 that are always in pressure contact with the inner circumference of the cylinder 20. This will be described in detail with reference to FIGS. 13 to 17.

As shown in (a) of FIG. 13, when the braking force is not applied to the damper, that is, when the rod 30 is stationary and the first engaging portion 34 of the rod 30 does not move in a direction away from the end wall 23 of the cylinder 20, the pair of annular convex portions 56, 56 of the piston 50 are in pressure contact with the inner circumference of the cylinder 20 as shown by stippled hatching in (b) of FIG. 13. In this state, as shown in (a) of FIG. 13, the stopper portion 35 of the rod 30 abuts against one end side of the piston 50, and the second engaging portion 37 of the rod 30 is engaged with the engaged portion 61 of the piston 50. In the following description (including other embodiments), a portion S of the outer circumference of the piston 50 that is in pressure contact with the inner circumference of the cylinder 20 excluding the convex portion 53 (hereinafter, also referred to as a "cylinder pressure contact portion S"), is also represented by stippled hatching. In the above state, the cutout portions 54, 54 formed in the convex portion 53 of the piston 50 are not in close contact with the inner circumference of the cylinder 20 (this is also the same in FIGS. 14 to 17).

Then, for example, a glove box or the like is opened from the opening, and a load acts in a direction of an arrow F1, so that the first engaging portion 34 moves in a direction away from the end wall 23 of the cylinder 20, that is, the rod 30 moves in the braking direction with respect to the cylinder 20 from the state shown in (a) of FIG. 13. Since the first engaging portion 34 of the rod 30 abuts against the other end portion 52 of the piston 50, the piston 50 is pressed toward one end portion side (a convex portion 53 side) by the first engaging portion 34 as shown in (a) of FIG. 14. In this state, as shown in (a) of FIG. 14, the stopper portion 35 of the rod 30 is away from one end side of the piston 50, and a gap is formed between the stopper portion 35 and one end side of the piston 50 (the same applies to cases shown in FIGS. 15 to 17).

At this time, the pair of annular convex portions 56, 56 is always in pressure contact with the inner circumference of the cylinder 20, whereby movement of the piston 50 in the cylinder 20 is suppressed. However, in this state, since the other end portion 52 of the piston 50 is pressed toward one end portion side, a compression force (the axial compression force) acts axially on the piston 50, and one end portion of the piston 50 is increased in diameter as the piston 50 is compressed from the other end 52 side (an inner diameter side of the piston 50 is reduced in diameter). As a result, in addition to the pair of annular convex portions 56, 56 that are always in pressure contact with the inner circumference of the cylinder 20, the outer circumference of the piston 50 is in pressure contact with the inner circumference of the cylinder 20 from one end side of the other end portion 52, thereby increasing the damper braking force.

When an opening load larger than that in the state of FIG. 14 is applied and the piston 50 attempts to move faster in the direction away from the end wall 23 of the cylinder 20 (see (a) of FIG. 15), a pressing force from the first engaging portion 34 on the other end portion 52 of the piston 50 increases, and the axial compression force on the piston 50 increases. As a result, since a compression amount of the piston 50 increases, as shown in (b) of FIG. 15, area of the cylinder pressure contact portion S on the outer circumference of the piston 50 increases as compared with the case shown in (b) of FIG. 14, and the entire circumference of a part of the outer circumference of the piston 50 (a predetermined range from a base end side of the other end portion 52) is in pressure contact with the inner circumference of the cylinder 20, thereby increasing the damper braking force to suppress an increase in an opening speed of the glove box and the like, and to prevent the glove box from being opened vigorously. Since a tip end side of the cutout portion 54 provided in the piston 50 is in pressure contact with the inner circumference of the cylinder 20, entry and exit of the air from the other end side of the piston 50 through the gap between the cutout portion 54 and the inner circumference of the cylinder 20 are blocked (the same applies to cases shown in FIGS. 16 and 17 described below).

When an opening load larger than that in the state of FIG. 15 is applied and the piston 50 moves faster in the direction away from the end wall 23 of the cylinder 20 (see (a) of FIG. 16), the pressing force from the first engaging portion 34 on the other end portion 52 of the piston 50 further increases, and the axial compression force on the piston 50 further increases. As a result, since the compression amount of the piston 50 increases, as shown in (b) of FIG. 16, the entire circumferential pressure contact portion of the piston 50 with respect to the inner circumference of the cylinder 20 (hereinafter, also simply referred to as a "piston entire circumferential pressure contact portion") increases as compared with the case shown in (b) of FIG. 15, thereby further increasing the damper braking force.

When an opening load larger than that in the state of FIG. 16 is applied and the piston 50 moves faster in the direction away from the end wall 23 of the cylinder 20 (see (a) of FIG. 17), the pressing force from the first engaging portion 34 on the other end portion 52 of the piston 50 further increases, and the axial compression force on the piston 50 further increases, so that the compression amount of the piston 50 increases. Therefore, as shown in (b) of FIG. 17, the entire circumferential pressure contact portion of the piston 50 increases as compared with the case shown in (b) of FIG. 16, thereby further increasing the damper braking force.

As described above, in this embodiment, as shown in FIGS. 13 to 17, a pressure contact amount of the piston 50 with the inner circumference of the cylinder 20 gradually increases from the other end side of the piston 50 depending on the speed at which the piston 50 is away from the end wall 23 of the cylinder 20, thereby increasing the damper braking force. In this embodiment, during the damper braking, the entire circumference of at least a part of the piston 50 in the axial direction is in pressure contact with the inner circumference of the cylinder 20 due to the axial compression force, whereas the cutout portion 54 formed in the convex portion 53 is not in close contact with the inner circumference of the cylinder 20 (see (b) of FIG. 14, (b) of FIG. 15, (b) of FIG. 16 and (b) of FIG. 17). Thereby, the air accumulated between the pressure contact portion S and the convex portion 53 escapes to outside through the cutout portion 54 formed in the convex portion 53.

According to the damper 10 in this embodiment, (1) the gap between the flat surface 40 of the first engaging portion 34 of the rod 30 and the inner circumference of the cylinder 20, (2) the gap between the first engaging portion 34 of the rod 30 and the other end of the piston 50, (3) the gap between the groove 43 of the rod 30 and the inner circumference of the piston 50, (4) the gap between the outer circumference of the rod 30 and the air flow groove 62 of the piston 50, (5) the gap between the recess 38 of the rod 30 and the inner circumference of the piston 50, (6) the gap between the second column portion 39 of the rod 30 and the inner circumference of the piston 50 due to the protrusion 41. (7) the gap between the cut portion 35a of the stopper portion 35 of the rod 30 and one end of the piston 50, and (8) the gap between the flat surface 40 of the stopper portion 35 of the rod 30 and the inner circumference of the cylinder 20, are provided in the cylinder 20 as passages for allowing the air to pass through the piston 50.

As shown in FIG. 10, when the rod 30 is stationary and the damper braking force is not applied, gaps of (1) to (8) are ensured. As shown in FIGS. 14 to 16, when the rod 30 moves in the damper braking direction, the first engaging portion 34 of the rod 30 abuts against the other end of the piston 50, so that the gap of (2) disappears, but the gaps of (1) and (3) to (8) are ensured. As shown in FIG. 18, when the rod 30 moves in the damper returning direction, the first engaging portion 34 of the rod 30 is away from the other end of the piston 50 again, so that the gaps of (1) to (8) are ensured.

In the damper 10, as shown in FIGS. 18 to 22, due to a relationship between the convex portion 53 provided on the piston 50 and the engaged portion 61 arranged on the damper returning direction side with respect to the convex portion 53, when the rod 30 and the piston 50 move in the damper returning damper returning direction, an axial tensile force acts on the piston 50 between the engaged portion 61 and the convex portion 53.

In the damper 10, when switching from a state of the damper braking to a state where the damper braking force is released, that is, when the rod 30 moves in the damper returning direction from a state where the axial compression force acts on the piston 50 and the piston 50 is increased in diameter to increase a friction force on the inner circumference of the cylinder 20 as shown in FIG. 17, the following operation is performed, whereby the piston 50 can easily return to a predetermined position.

That is, when the rod 30 moves in the damper returning direction from the state shown in FIG. 17, the second engaging portion 37 of the rod 30 is engaged with the engaged portion 61 of the piston 50 and pushes the piston 50 toward the damper returning direction side as shown in (a) of FIG. 18. At this time, since the convex portion 53 of the piston 50 is in pressure contact with the inner circumference of the cylinder 20, as shown in (b) of FIG. 18, while movement of one end side of the piston 50 is suppressed, the other end side is pushed in a direction away from one end side, and the axial tensile force acts on the piston 50 between the engaged portion 61 and the convex portion 53, so that the piston 50 formed of the elastic resin material in a reduced diameter state is extended axially to be reduced in diameter, thereby reducing a pressure contact force on the inner circumference of the cylinder 20. The first engaging portion 34 of the rod 30 is away from the other end side of the piston 50.

As a result, as shown in (a) of FIG. 19. (a) of FIG. 20 and (a) of FIG. 21, one end side of the piston 50 formed of the elastic resin material is extended toward the stopper portion 35 by an own elastic restoring force, and accordingly, the cylinder pressure contact portion S decreases as shown in (b) of FIG. 19, (b) of FIG. 20 and (b) of FIG. 21. Particularly as shown in (a) of FIG. 21, when one end of the piston 50 is close to the stopper portion 35, the cylinder pressure contact portion S of the piston 50 penetrates in the axial direction of the piston 50 to generate an air flow path. When the piston 50 is further extended, as shown in FIG. 22, one end side of the piston 50 abuts against the stopper portion 35 of the rod 30, so that the extension of the piston 50 is restricted, and the piston 50 is held at the predetermined position of the piston mounting portion 32 of the rod 30.

As described above, in the damper 10, when the rod 30 moves in the damper returning direction from the state of the damper braking, the second engaging portion 37 of the rod 30 is engaged with the engaged portion 61 of the piston 50, the axial tensile force acts on the piston 50 between the engaged portion 61 and the convex portion 53, and the other end side of the piston 50 is extended to one end side restricted by the convex portion 53, so that the piston 50 can be reduced in diameter to return to the original shape. As a result, the friction force of the piston 50 on the inner circumference of the cylinder 20 can be reduced, and the piston 50 can easily return.

Next, operation and effects of the damper 10 configured as described above will be described.

As described above, in the damper 10, during the damper braking, the first engaging portion 34 of the rod 30 abuts against the other end portion 52 of the piston 50, and the axial compression force acts on the piston 50 between the first engaging portion 34 and the pair of annular convex portions 56, 56 of the convex portion 53 that are in pressure contact with the inner circumference of the cylinder 20.

Therefore, when the rod 30 moves in the braking direction with respect to the cylinder 20, the first engaging portion 34 of the rod 30 abuts against the other end portion 52 of the piston 50, and as shown in (a) of FIG. 14, (a) of FIG. 15, (a) of FIG. 16 and (a) of FIG. 17, the piston 50 is pressed while the pair of annular convex portions 56, 56 in the base end of the piston 50 are always in pressure contact with the inner circumference of the cylinder 20, so that as shown in (b) of FIG. 14, (b) of FIG. 15, (b) of FIG. 16 and (b) of FIG. 17, when the axial compression force acts on the piston 50 and the piston 50 is compressed axially, the pressure contact amount of the piston 50 with the inner circumference of the cylinder increases and the cylinder press contact portion S increases, thereby increasing the damper braking force.

In this case, as a moving speed of the rod 30 in the damper braking direction becomes higher, the axial compression force on the piston 50 increases and the piston 50 is compressed more, so that the cylinder pressure contact portion S further increases, thereby rapidly increasing the damper braking force. On the other hand, when the moving speed of the rod 30 in the damper braking direction is low, the axial compression force on the piston 50 decreases, so that the area of the cylinder pressure contact portion S decreases, resulting in gradual increase in the braking force. Therefore, the damper 10 having high load response performance, in which the braking force varies depending on the moving speed of the rod 30, can be provided.

Explaining the above load response performance in detail, different form a structure in which the first seal member and the second seal member are separate bodies as the damper disclosed in Patent Literature 1 above, since the damper 10 includes the piston 50 integrally formed of the elastic resin material, the convex portion 53 that is always in pressure contact with the inner circumference of the cylinder 20 (here, the pair of annular convex portions 56, 56), and a portion where the pressure contact amount with the inner circumference of the cylinder 20 increases depending on the moving speed of the rod 30 (a portion on the other end side with respect to the convex portion 53 of the piston 50), can rapidly change the pressure contact amount of the piston 50 with the inner circumference of the cylinder 20 depending on the moving speed of the rod 30, so that the load response performance is high.

In this embodiment, as described above, the piston 50 includes the cutout portion 54 on the outer circumference thereof, and the cutout portion 54 is formed at least partway from one end to the other end side or from the other end to one end side (here, formed from one end side of the other end portion 52 of the main body 51 to one end of the main body 51). Therefore, when the rod 30 moves, the first engaging portion 34 of the rod 30 abuts against the other end portion 52 of the piston 50, and the axial compression force acts on the piston 50 between the first engaging portion 34 and the convex portion 53 that is always in pressure contact with the inner circumference of the cylinder, the air can escape to a first chamber R1 side or a second chamber R2 side, so that the piston 50 can be easily crushed (when there is no air escape path, the piston is less likely to be deformed in the cylinder).

According to the damper 10 in this embodiment, since the gaps of (1) to (8) are provided in the cylinder 20 as the passages for allowing the air pass through the piston 50, during the damper braking as shown in FIGS. 14 to 17 (here, when the first engaging portion 34 of the rod 30 moves in the direction away from the end wall 23 of the cylinder 20), even when the entire circumference of a part of the main body 51 is in pressure contact with the inner circumference of the cylinder 20, the air moves to the first chamber R1 side through the gaps of (1) to (8), so that the movement of the rod 30 is not hindered (when the air does not move to the first chamber R1 side an internal pressure of the first chamber R1 excessively decreases and the movement of the rod 30 is hindered).

In this embodiment, the outer circumference of the piston 50 has the circular shape (here, the outer circumference of the main body 51 has the circular shape), and the cutout portion 54 has the shape obtained by cutting a part of the circular shape with one plane when the piston 50 is viewed axially shown in (e) of FIG. 4. Therefore, when the piston 50 is compressed and increased in diameter, the outer circumference of the piston 50 easily abuts against the inner circumference of the cylinder 20 (cross-sectional area of the compressed the piston 50 decreases), so that the load response performance of the damper can be further improved.

In this embodiment, the cutout portion 54 extends so as to penetrate the convex portion 53 in the axial direction, and during the damper braking, the entire circumference of at least a part of the piston 50 in the axial direction is in pressure contact with the inner circumference of the cylinder 20 due to the axial compression force, whereas the cutout portion 54 formed in the convex portion 53 is not in close contact with the inner periphery of the cylinder 20 (see (b) of FIG. 14, (b) of FIG. 15, (b) of FIG. 16 and (b) of FIG. 17). Therefore, even when the air is accumulated between the portion where the entire circumference of the piston 50 is in pressure contact with the inner circumference of the cylinder 20 (the piston entire circumferential pressure contact portion) and the convex portion 53, the air can escape through the gap between the cutout portion 54 formed in the convex portion 53 and the inner circumference of the cylinder 20, so that diameter increase of the piston 50 due to the axial compression force can be prevented from being hindered (when the air cannot be discharged, the movement of the piston 50 is restricted and the diameter increase is likely to be hindered).

In this embodiment, the outer circumference of the piston 50 has the shape whose diameter is reduced from one end side toward the other end side. Here, as shown in (c) and (d) of FIG. 4, the outer circumference of the main body 51 of the piston 50 has the shape whose diameter is gradually reduced from the other end of the convex portion 53 toward the tapered the other end portion 52. Therefore, when the piston 50 is compressed and increased in diameter during the damper braking, contact area of the outer circumference of the piston 50 with the inner circumference of the cylinder 20 gradually increases (the cross-sectional area of the compressed piston 50 gradually increases), so that the damper braking force can be easily adjusted.

On the other hand, when a member such as the opening and closing body is closed with respect to a member such as the instrument panel and the rod 30 moves in the damper returning direction as shown by the arrow F2 in FIG. 9, from the state where the rod 30 moves in the damper braking direction, the piston 50 is compressed and the pressure contact amount with the inner circumference of the cylinder increases (see FIG. 17), the damper 10 works as follows.

That is, in the damper 10, when the member such as the opening and closing body is closed with respect to the member such as the instrument panel and the rod 30 moves in damper returning direction as shown by the arrow F2 in FIG. 9, from the state where the rod 30 moves in the damper braking direction and the piston 50 is compressed and increased in diameter (see FIG. 17), the second engaging portion 37 of the rod 30 is engaged with the engaged portion 61 of the piston 50 (see (a) of FIG. 18) and pushes the piston 50 toward the damper returning direction side. At this time, since the convex portion 53 of the piston 50 is in pressure contact with the inner circumference of the cylinder 20, while the movement of one end side of the piston 50 is suppressed, the other end side is pushed in the direction away from one end side, and the axial tensile force acts on the piston 50 between the engaged portion 61 and the convex portion 53, so that the piston 50 formed of the elastic resin material in the reduced diameter state is extended axially to be reduced in diameter. As shown in FIGS. 19, 20 and 21, the piston 50 is extended so as to approach an original length due to the elastic restoring force. Finally, as shown in FIG. 22, the other end of the piston 50 abuts against the stopper portion 35 of the rod 30, and further extension is restricted, so that the piston 50 is held at the predetermined position of the piston mounting portion 32 of the rod 30. As a result, since the piston 50 is reduced in diameter to return to the original shape and a portion other than the convex portion 53 on the outer circumference of the piston 50 is not in pressure contact with the inner circumference of the cylinder 20, the friction force of the piston 50 on the inner circumference of the cylinder 20 can be reduced, and the piston 50 can easily return to the predetermined position in the cylinder 20.

As described above, in the damper 10, when the rod 30 moves in the damper returning direction, the second engaging portion 37 on the damper returning direction side with respect to the convex portion 53 of the piston 50 is engaged with the engaged portion 61 of the piston 50, the piston 50 is moved and the axial tensile force acts on the piston 50 between the engaged portion 61 and the convex portion 53, whereby the piston 50 formed of the elastic resin material is extended axially. Therefore, the piston 50 can be rapidly reduced in diameter to return to the original shape, the friction force on the inner circumference of the cylinder can be reduced, and the piston 50 can easily return.

Figure 5:
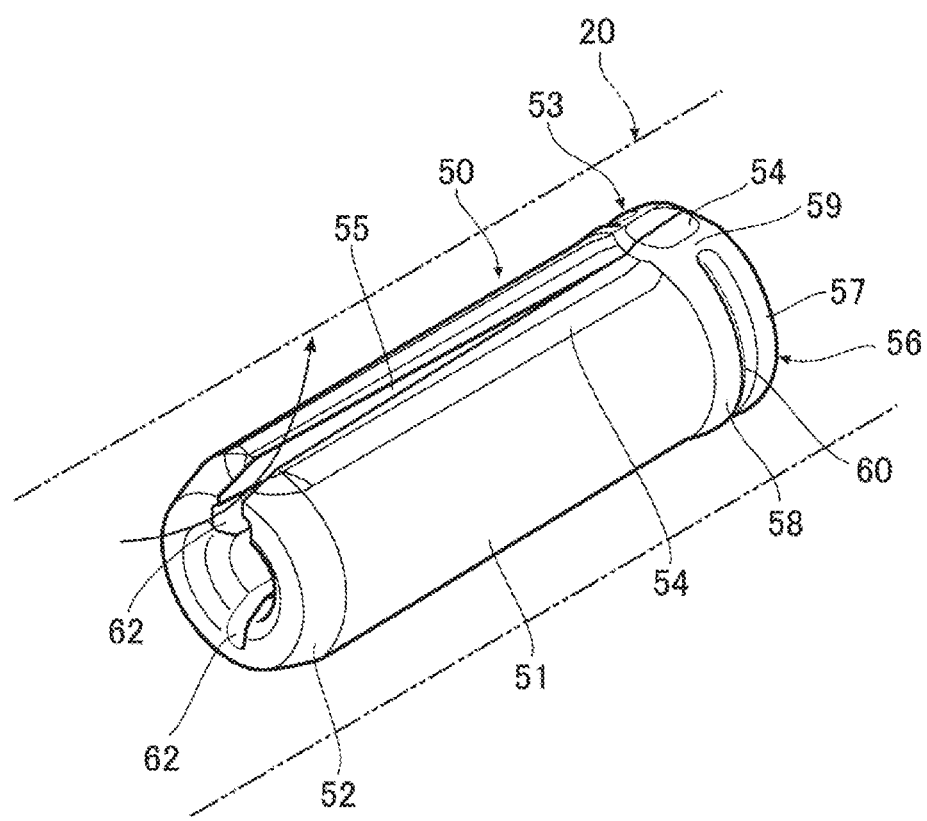
FIG. 5 is a perspective view showing a state of the piston constituting the damper when the rod moves in a returning direction on a side opposite to a braking direction.

When the rod 30 moves in the damper returning direction, since the engaging portion 34 of the rod 30 is away from the other end side of the piston 50, as shown by arrows in FIG. 10, the air in the first chamber R1 passes through the gap of (1) between the flat surface 40 of the engaging portion 34 of the rod 30 and the inner circumference of the cylinder 20, and flows into the gap between the outer circumference of the rod 30 and the air flow groove 62 of the piston 50 from the gap of (2) between the first engaging portion 34 of the rod 30 and the other end of the piston 50. Since the slit 55 in a closed state is opened by being pushed by air pressure as shown in FIGS. 5 and 9, the air between the outer circumference of the rod 30 and the inner circumference of the piston 50 can be discharged to one end side of the piston 50. The air can be discharged to outside of the piston mounting portion 32 of the rod 30 through the gap of (7) between the cut portion 35a of the stopper portion 35 of the rod 30 and one end of the piston 50 or the gap of (8) between the flat surface 40 of the stopper portion 35 of the rod 30 and the inner circumference of the cylinder 20 (see FIG. 10). Thereby, the damper braking force can be easily released and the piston 50 can easily return.

As shown in FIGS. 3 and 4, in this embodiment, since the convex portion 53 provided in the piston 50 is a convex portion protruding outward in a radial direction of the piston 50 (here, the annular convex portion 56 including the plurality of convex portions 57, 58, 59), the piston 50 including the convex portion 53 can be integrally molded, and the piston 50 can be easily manufactured.

As shown in FIG. 2, in this embodiment, the plurality of protrusions 41 that abut against the inner circumference of the piston 50 are formed, to extend axially from a second engaging portion 37 side of the rod 30 toward the base end side, and at the predetermined intervals in the circumferential direction. Therefore, when the rod 30 moves in the damper returning direction and the piston 50 is extended, the contact area between the outer circumference of the rod 30 and the inner circumference of the piston 50 can be reduced, and the piston 50 can easily return to the original shape.

As shown in FIGS. 3 and 4, in this embodiment, the cutout portion 54 that forms the gap between the outer circumference of the piston 50 and the inner circumference of the cylinder 20 is formed on the outer circumference of the piston 50 from the other end portion 52 on the damper returning direction side toward one end portion on the damper braking direction side. Therefore, the contact area of the piston 50 with the inner circumference of the cylinder 20 can be reduced on the damper returning direction side of the piston 50, and when the rod 30 moves in the damper returning direction and the piston 50 is extended, the piston 50 can easily return to the original shape.

As shown in (c) and (d) of FIG. 4, in this embodiment, the outer circumference of the piston 50 (here, the outer circumference of the main body 51) has the tapered shape whose diameter is increased from the other end portion 52 on the damper returning direction side toward one end portion on the damper braking direction side. Therefore, when the rod 30 moves in the damper returning direction, the damper returning direction side of the piston 50 can be less likely to be in pressure contact with the inner circumference of the cylinder 20, and the piston 50 is extended and can easily return to the original shape.

The piston 50 is inserted into the cylinder 20 as follows. That is, as shown in FIG. 11, the rod 30 having the piston 50 mounted on the piston mounting portion 32 is inserted into the opening 22 of the cylinder 20 from the tip end side of the rod 30, and is pushed into the cylinder 20. At this time, the cutout portions 54, 54 of the piston 50 are aligned with the pair of fitting holes 25, 25 of the cylinder 20, and the rod 30 is pushed in this state.

Then, as described above, as shown in (a) and (b) of FIG. 12, the first convex portions 57, 58 juxtaposed in the axial direction of the annular convex portion 56 are crushed in an order from the first convex portion 58 on the other end portion 52 side to the first convex portion 57 on one end side, so that the air in the recess 60 inside the annular convex portion 56 is inserted while being pushed out, and further the first convex portions 57, 58 attempt to return to the original shape in the cylinder 20. In this way, the crushed sealed space R3 is widened and depressurized, whereby the convex portion 53 is adsorbed to the inner circumference of the cylinder 20.

As described above, in the damper 10, when the rod 30 on which the piston 50 is mounted is inserted from the opening 22 of the cylinder 20 from the tip end side of the rod 30, the first convex portions 57, 58 juxtaposed in the axial direction of the annular convex portion 56 are sequentially crushed and inserted into the inner circumference of the cylinder 20, so that insertion resistance of the piston 50 can be reduced, and workability of inserting the piston 50 into the cylinder 20 can be improved.

In this embodiment, between the second convex portions 59, 59 adjacent to each other in the circumferential direction of the main body 51 of the pair of annular convex portions 56, 56 constituting the convex portion 53 of the piston 50, the cutout portions 54, 54 each having the shape obtained by cutting a part of the circular shape of the main body 51 with one plane are provided when the piston 50 is viewed axially as shown in (e) of FIG. 4. Therefore, in a case where the fitting holes 25, 25 for cap mounting are formed in vicinity of the opening 22 as in the cylinder 20 in this embodiment, when the piston 50 is inserted into the cylinder 20, the cutout portions 54, 54 provided in the convex portion 53 of the piston 50 are inserted by being aligned into the fitting holes 25, 25 of the cylinder 20 as shown in FIG. 11, whereby the annular convex portion 56 of the convex portion 53 can be suppressed from being damaged by the fitting holes 25, 25 of the cylinder 20 (when an inner circumferential edge of the fitting hole 25 is in contact with the annular convex portion 56 of the piston 50 formed of the elastic resin material, the annular convex portion 56 is easily damaged). As a result, a decrease in the friction force of the piston 50 on the inner circumference of the cylinder 20 due to the annular convex portion 56 of the convex portion 53 can be effectively suppress.

In this embodiment, the convex portion 53 of the piston 50 is provided on the other end side of the main body 51 in the damper braking direction, and the cutout portion 54 provided in the convex portion 53 extends toward the other end of the main body 51 in the damper returning direction. Therefore, as shown in (a) and (b) of FIG. 6, for example, when the pair of molds 101, 103 are split by the parting line PL after the piston 50 is formed by the pair of molds 101, 103, burrs are generated on the outer circumference of the piston 50, but the burrs generated by the mold split can be provided in the cutout portions 54, 54 of the piston 50, so that a decrease in the friction force of the piston 50 on the inner circumference of the cylinder 20 can be suppressed due to the burrs contacting the inner circumference of the cylinder 20 and creating a gap.

In the damper 10, as described above, by inserting the piston 50 into the cylinder 20, the convex portion 53 is adsorbed to the inner circumference of the cylinder 20, so that when the piston 50 moves in the cylinder 20, frictional resistance with respect to the inner circumference of the cylinder 20 can be increased and the damper braking force can be increased, and when the piston 50 moves in the cylinder 20, a posture of the piston 50 can be easily maintained and a stable braking force can be obtained.

In this embodiment, the plurality of annular convex portions 56 are arranged along the circumferential direction of the outer circumference of the piston 50. Here, as shown in (e) of FIG. 4, when the piston 50 is viewed axially, the annular convex portion 56 is arranged in the pair at two corresponding circumferential positions of the convex portion 53. Since the plurality of annular convex portions 56 are arranged on the outer circumference of the piston 50 in this way, even when a seal leak occurs in any one of the annular convex portions 56 (the air escapes from the recess 60 and the adsorption effect does not occur on the annular convex portion 56), the damper braking force can be suppressed from decreasing by the other annular convex portion 56.

In this embodiment, the annular convex portions 56 provided in the convex portion 53 are formed in a pair arranged at two corresponding circumferential positions when the piston 50 is viewed from axially as shown in (e) of FIG. 4, and the cutout portions 54 are formed in a pair provided between the pair of annular convex portions 56, 56, so that as described above, the mold parting line PL during molding of the piston 50 can be easily located in the cutout portions 54, 54, and the friction force of the pair of annular convex portions 56, 56 can be applied to the inner circumference of the cylinder 20 in a well-balanced manner.

FIGS. 23 to 30 show a damper according to a second embodiment of the present invention. The same parts as those in the above embodiment are denoted by the same reference numerals, and descriptions thereof will be omitted.

A damper 10A of this embodiment differs from the above embodiment in a structure of a piston. As shown in FIG. 23, in a piston 50A in this embodiment, the cutout portion 54 is not formed in the convex portion 53, and the entire circumference of the convex portion 53 is in pressure contact with an inner circumference of the cylinder 20. Cutout portions 63, 63 each having a concave groove shape with a predetermined depth are formed at two positions on an outer circumference of the main body 51 from the other end side of the convex portion 53 to the an axial the other end surface of the main body 51.

In this embodiment, when the first engaging portion 34 moves in a damper braking direction from a stationary state of the rod 30 shown in FIG. 24, as shown in (a) of FIG. 25, the first engaging portion 34 abuts against the other end portion 52 of the piston 50A, the piston 50A is pressed and an axial compression force acts, and a pressure contact amount of the piston 50A on the inner circumference the cylinder increases, thereby increasing a damper braking force (see (b) of FIG. 25). When the first engaging portion 34 moves faster in the damper braking direction as shown in (a) of FIG. 26, (a) of FIG. 27 and (a) of FIG. 28, area of the cylinder pressure contact portion S of the piston 50A gradually increases as shown in (b) of FIG. 26, (b) of FIG. 27 and (b) of FIG. 28, so that the damper braking force is increased due to a moving speed.

In this way, also in this embodiment, as the moving speed of the rod 30 in the damper braking direction becomes higher, the axial compression force on the piston 50 increases and the piston 50 is compressed more, so that the damper braking force can be rapidly increased, and load response performance is high.

In this embodiment, the cutout portion is not formed in the convex portion 53, and during damper braking, the entire circumference of the convex portion 53 is in pressure contact with the inner circumference of the cylinder 20, while a portion of the piston 50A where the cutout portion 63 having the concave groove shape is provided is not in close contact with the inner circumference of the cylinder 20 and forms a gap with the inner circumference. Therefore, even when air is accumulated between the convex portion 53 of the piston 50A and the cylinder pressure contact portion S (increased diameter portion of the piston 50A), the air can be discharged from the gap between the cutout portion 63 of the piston 50A and the inner circumference of the cylinder 20 (here, the air can be discharged to a first chamber R1 side), whereby diameter increase of the piston 50A can be prevented from being hindered.

On the other hand, when the rod 30 moves in a damper returning direction as shown in FIG. 29 from a state where the rod 30 moves in the damper braking direction, and the piston 50A is compressed and increased in diameter as shown in FIG. 28, the second engaging portion 37 of the rod 30 is engaged with the engaged portion 61 of the piston 50A, and an axial tensile force acts on the piston 50A between the engaged portion 61 and the convex portion 53, whereby the piston 50A is extended axially. Then, as shown in FIG. 30, since one end of the piston 50A abuts against the stopper portion 35 of the rod 30 and the piston 50A is reduced in diameter to return to an original shape, a friction force on the inner circumference of the cylinder 20 of the piston 50A can be reduced, and the piston 50A can easily return to a predetermined position.

In this embodiment, when the rod 30 moves in the damper returning direction, the portion of the piston 50A where the cutout portion 63 is provided is not in close contact with the inner circumference of the cylinder 20 and forms the gap with the inner circumference (see (b) of FIG. 29), so that the air can be discharged to the first chamber R1 side from this gap.

FIGS. 31 to 35 show a damper according to a third embodiment of the present invention. The same parts as those in the above embodiment are denoted by the same reference numerals, and descriptions thereof will be omitted.

A damper 10B of this embodiment differs from the above embodiment in a structure of a piston. As shown in FIG. 31, in a piston 50B in this embodiment, a cutout portion is not formed in a portion of an outer circumference of the main body 51 on the other end side with respect to the convex portion 53, and the entire circumference has a circular shape.

In this embodiment, when the first engaging portion 34 moves in a damper braking direction from a stationary state of the rod 30 shown in FIG. 32, as shown in (a) of FIG. 33, the first engaging portion 34 abuts against the other end portion 52 of the piston 50B, the piston 50B is pressed and an axial compression force acts, and a pressure contact amount of the piston 50B on an inner circumference the cylinder increases, thereby increasing a damper braking force (see (b) of FIG. 33), so that the damper 10B having high load response performance can be provided. Air accumulated between the convex portion 53 of the piston 50B and the cylinder pressure contact portion S is discharged toward a damper braking direction side through a gap between the cutout portion 54 formed in the convex portion 53 and the inner circumference of the cylinder 20.

On the other hand, when the rod 30 moves in a damper returning direction as shown in FIG. 34 from a state where the rod 30 moves in the damper braking direction, and the piston 50B is compressed and increased in diameter as shown in FIG. 33, the second engaging portion 37 of the rod 30 is engaged with the engaged portion 61 of the piston 50B, and an axial tensile force acts on the piston 50B between the engaged portion 61 and the convex portion 53, whereby the piston 50B is extended axially. Then, as shown in FIG. 35, since one end side of the piston 50B abuts against the stopper portion 35 of the rod 30 and the piston 50B is reduced in diameter to return to an original shape, a friction force on the inner circumference of the cylinder 20 of the piston 50B can be reduced, and the piston 50B can be easily return to a predetermined position.

FIGS. 36 to 40 show a damper according to a fourth embodiment of the present invention. The same parts as those in the above embodiment are denoted by the same reference numerals, and descriptions thereof will be omitted.

A damper 10C of this embodiment differs from the above embodiment in a structure of a piston. That is, an outer circular shape of the main body 51 of a piston 50C has a shape the same as that of the piston 50 in the first embodiment (see (a) of FIG. 36), and a plurality of grooves 63 each having a concave groove shape and extending along a circumferential direction are formed on an inner circumference of the main body 51 along an axial direction of the main body 51 as shown in (b) of FIG. 36. A gap is formed between the inner circumference of the main body 51 of the piston 50C, and the second engaging portion 37 or the second column portion 39 of the rod 30 by these grooves 63.

In this embodiment, when the first engaging portion 34 moves in a damper braking direction from a stationary state of the rod 30 shown in FIG. 37, as shown in (a) of FIG. 38, the first engaging portion 34 abuts against the other end portion 52 of the piston 50C, the piston 50C is pressed and an axial compression force acts, and a pressure contact amount of the piston 50C on the inner circumference the cylinder increases, thereby increasing a damper braking force (see (b) of FIG. 38), so that the damper OC having high load response performance can be provided. In this embodiment, since the plurality of grooves 63 each having the concave groove shape are formed axially on the inner circumference of the main body 51, during damper braking, a wide gap can be ensured between the inner circumference of the piston 50C and the outer circumference of the rod 30, and air can be easily discharged.

On the other hand, when the rod 30 moves in a damper returning direction as shown in FIG. 39 from a state where the rod 30 moves in the damper braking direction, and the piston 50C is compressed and increased in diameter as shown in FIG. 38, the second engaging portion 37 of the rod 30 is engaged with the engaged portion 61 of the piston 50C, and an axial tensile force acts on the piston 50C between the engaged portion 61 and the convex portion 53, whereby the piston 50C is extended axially. Then, as shown in FIG. 40, since one end side of the piston 50C abuts against the stopper portion 35 of the rod 30 and the piston 50C is reduced in diameter to return to an original shape, a friction force on the inner circumference of the cylinder 20 of the piston 50C can be reduced, and the piston 50C can be easily return to a predetermined position.

In this embodiment, as described above, since the plurality of grooves 63 along the circumferential direction are provided on the inner circumference of the piston 50C in the axial direction of the piston 50C, the piston 50C can be easily deformed, and diameter increase of the piston 50C when moving in the damper braking direction and diameter reduction thereof due to extension of the piston 50 when moving in the damper returning direction can be more effectively performed.

Each of the embodiments described above provides a configuration in which when the first engaging portion 34 of the rod 30 moves in a direction away from the end wall 23 of the cylinder 20, the braking force is applied by the damper, and when the first engaging portion 34 moves in a direction close to the end wall 23 of the cylinder 20, the braking force by the damper is released. However, on the contrary, there may be provided a configuration in which when the first engaging portion of the rod moves in the direction close to the end wall of the cylinder (including the cap mounted on an cylinder end portion), the braking force is applied by the damper, and when moving in the away direction, the braking force is released.

For example, FIG. 41 is an enlarged explanatory view of a main part of a damper 10D in which a damper braking direction is reversed. In the damper 10D, a shape of a rod and a mounting direction of a piston are different from those of the above embodiments. The rod 30 has a shape in which the first column portion 36 extends longer than the second column portion 39. The piston 50 is mounted on the piston mounting portion 32 of the rod 30 with the other end portion 52 of the piston 50 facing the stopper portion 35 of the rod 30 and the convex portion 53 of the piston 50 facing the first engaging portion 34 of the rod 30. The mounting direction of the piston 50 is opposite to the damper of each of the above embodiments. Then, when the first engaging portion 34 of the rod 30 moves in a direction close to an end wall (not shown) of the cylinder 20 (a left side in the drawing), that is, when moving in a direction shown by the arrow F1 in FIG. 41, the stopper portion 35 of the rod 30 (constituting an "engaging portion" in the present invention) abuts against the other end portion 52 of the piston 50, and an axial compression force acts between the stopper portion 35 and the convex portion 53, so that a braking force is applied by the damper. On the other hand, when the first engaging portion 34 of the rod 30 moves in a direction away from the end wall (not shown) of the cylinder 20, that is, when moving in a direction shown by the arrow F2 in FIG. 41, the second engaging portion 37 of the rod 30 is engaged with the engaged portion 61 of the piston 50, and an axial tensile force acts on the piston 50, so that the damper braking force is released.

The present invention is not limited to the embodiments described above and various modified embodiments are possible within the scope of the present invention; such embodiments are also included in the scope of the present invention.

REFERENCE SIGNS LIST 10, 10A, 10B, 10C, 10D damper
20 cylinder
30 rod
31 shaft portion
32 piston mounting portion
34 first engaging portion (engaging portion)
50, 50A, 50B, 50C piston
51 main body
52 the other end portion
53 convex portion
54, 63, cutout portion
55 slit
56, 56 annular convex portion
61 engaged portion
80 cap
81, 81 half-divided body
83 flange portion

The invention claimed is:
1. A damper that is attached between a pair of members close to and away from each other and applies a braking force when the pair of members is close to or away from each other, the damper characterized by comprising:
a cylindrical cylinder having an opening at an end portion thereof;
a rod movably inserted through the opening of the cylinder and including an engaging portion; and
a piston formed of an elastic resin material, which extends along an axial direction of the rod in a predetermined length and is mounted to the rod so as to surround the rod, wherein
the piston includes a convex portion provided on a side of one end in an axial direction and always coming in pressure contact with an inner circumference of the cylinder,
the piston includes a main body arranged so as to surround the rod,
the convex portion protrudes from an outer circumference of the main body outward in a radial direction and is formed in integral with the main body,
during braking of the damper, the engaging portion of the rod abuts against another end of the piston, so that an axial compression force acts on the piston between the engaging portion and the convex portion in pressure contact with the inner circumference of the cylinder and the piston is compressed by the axial compression force, and the piston comes in pressure contact with the inner surface of the cylinder, and the convex portion includes a plurality of convex portions extending along a circumferential direction of the main body and disposed in parallel to an axial direction of the main body.

2. A damper that is attached between a pair of members close to and away from each other and applies a braking force when the pair of members is close to or away from each other, the damper characterized by comprising:

a cylindrical cylinder having an opening at an end portion thereof;

a rod movably inserted through the opening of the cylinder and including an engaging portion; and a piston formed of an elastic resin material, which extends along an axial direction of the rod in a predetermined length and is mounted to the rod so as to surround the rod, wherein the piston includes a convex portion provided on a side of one end in an axial direction and always coming in pressure contact with an inner circumference of the cylinder, the piston includes the convex portion and an engaged portion that is engaged with the rod when the piston moves in a returning direction opposite to a braking direction of the damper, the engaged portion is arranged on the returning direction side with respect to the convex portion of the piston, so that an axial tensile force acts on the piston between the engaged portion and the convex portion when the piston moves in the returning direction and the piston is extended in the axial direction by the axial tensile force to be reduced in a diameter, and the convex portion includes a plurality of convex portions extending along a circumferential direction of the main body and disposed in parallel to an axial direction of the main body.

3. A damper that is attached between a pair of members close to and away from each other and applies a braking force when the pair of members is close to or away from each other, the damper characterized by comprising:

a cylindrical cylinder having an opening at an end portion thereof;

a rod movably inserted through the opening of the cylinder and including an engaging portion; and a piston formed of an elastic resin material, which extends along an axial direction of the rod in a predetermined length and is mounted to the rod so as to surround the rod, wherein the piston includes a convex portion provided on a side of one end in an axial direction and always coming in pressure contact with an inner circumference of the cylinder, during braking of the damper, the engaging portion of the rod abuts against another end of the piston, so that an axial compression force acts on the piston between the engaging portion and the convex portion in pressure contact with the inner circumference of the cylinder, the piston includes a main body extending along the axial direction of the rod in a predetermined length and arranged so as to surround the rod, and the convex portion protruding from an outer circumference of the main body outward in a radial direction and coming in pressure contact with the inner circumference of the cylinder, the convex portion includes a plurality of first convex portions extending along a circumferential direction of the main body and juxtaposed in an axial direction of the main body, and a second convex portion forming an annular convex portion in cooperation with the first convex portion by connecting predetermined circumferential positions of adjacent first convex portions to each other, and the annular convex portion of the convex portion comes in close contact with the inner circumference of the cylinder to form a sealed space inside thereof.

4. The damper according to claim 1, wherein the piston includes a cutout portion on an outer circumference thereof, and the cutout portion is formed at least partway from one end to the other end side or formed at least partway from the other end to one end side.

5. The damper according to claim 4, wherein the outer circumference of the piston has a circular shape, and the cutout portion has a shape obtained by cutting a part of the circular shape with one plane when the piston is viewed axially.

6. The damper according to claim 4, wherein the cutout portion extends so as to penetrate the convex portion in an axial direction, and during the braking of the damper, the entire circumference of at least a part of the piston in the axial direction comes in pressure contact with the inner circumference of the cylinder due to the axial compression force, while the cutout portion formed in the convex portion is configured not to come in close contact with the inner circumference of the cylinder.

7. The damper according to claim 4 or 5, wherein the cutout portion is not formed in the convex portion, and during the braking of the damper, the entire circumference of the convex portion comes in pressure contact with the inner circumference of the cylinder, while a portion where the cutout portion is provided is configured not to come in close contact with the inner circumference of the cylinder and configured to form a gap with the inner circumference.

8. A damper that is attached between a pair of members close to and away from each other and applies a braking force when the pair of members is close to or away from each other, the damper characterized by comprising:

a cylindrical cylinder having an opening at an end portion thereof;

a rod movably inserted through the opening of the cylinder and including an engaging portion; and a piston formed of an elastic resin material, which extends along an axial direction of the rod in a predetermined length and is mounted to the rod so as to surround the rod, wherein the piston includes a convex portion provided on a side of one end in an axial direction and always coming in pressure contact with an inner circumference of the cylinder, during braking of the damper, the engaging portion of the rod abuts against another end of the piston, so that an axial compression force acts on the piston between the engaging portion and the convex portion in pressure contact with the inner circumference of the cylinder, and the outer circumference of the piston has a shape that a diameter of the piston is reduced from one end side toward the other end side.

9. A damper that is attached between a pair of members close to and away from each other and applies a braking force when the pair of members is close to or away from each other, the damper characterized by comprising:

a cylindrical cylinder having an opening at an end portion thereof;

a rod movably inserted through the opening of the cylinder and including an engaging portion; and a piston formed of an elastic resin material, which extends along an axial direction of the rod in a predetermined length and is mounted to the rod so as to surround the rod, wherein the piston includes a convex portion provided on a side of one end in an axial direction and always coming in pressure contact with an inner circumference of the cylinder, during braking of the damper, the engaging portion of the rod abuts against another end of the piston, so that an axial compression force acts on the piston between the engaging portion and the convex portion in pressure contact with the inner circumference of the cylinder, and a plurality of recesses along a circumferential direction are provided on an inner circumference of the piston in the axial direction of the piston.

10. A damper that is attached between a pair of members close to and away from each other and applies a braking force when the pair of members is close to or away from each other, the damper characterized by comprising:

a cylindrical cylinder having an opening at an end portion thereof;

a rod movably inserted through the opening of the cylinder and including an engaging portion; and a piston formed of an elastic resin material, which extends along an axial direction of the rod in a predetermined length and is mounted to the rod so as to surround the rod, wherein the piston includes a convex portion provided on a side of one end in an axial direction and always coming in pressure contact with an inner circumference of the cylinder, during braking of the damper, the engaging portion of the rod abuts against another end of the piston, so that an axial compression force acts on the piston between the engaging portion and the convex portion in pressure contact with the inner circumference of the cylinder, the rod includes an engaging portion that is engaged with the engaged portion of the piston, and a plurality of protrusions that abut against the inner circumference of the piston are formed to extend in an axial direction and to be arranged at predetermined intervals in a circumferential direction, on an outer circumference of the rod on the braking direction side with respect to the engaging portion.

11. The damper according to claim 3, wherein
a plurality of the annular convex portions are arranged along the circumferential direction of the outer circumference of the piston.

12. The damper according to claim 11, wherein
the outer circumference of the main body has a circular shape, and
the second convex portion connects both circumferential end portions of the first convex portions adjacent to each other, and a cutout portion having a shape obtained by cutting a part of the circular shape with one plane is provided between the second convex portions adjacent to each other in the circumferential direction when the piston is viewed axially.

13. The damper according to claim 12, wherein
the convex portion is provided on a side of one end of the main body in the braking direction of the damper, and the cutout portion provided in the convex portion extends toward the other end of the main body in the returning direction of the damper.

14. The damper according to claim 3, wherein
when the piston is viewed axially, the annular convex portions are formed in a pair arranged at corresponding two positions in the circumferential direction, and the cutout portion is formed in a pair provided between the pair of annular convex portions.

15. The damper according to claim 2, wherein
the piston includes a cutout portion on an outer circumference thereof, and
the cutout portion is formed at least partway from one end to the other end side or formed at least partway from the other end to one end side.

16. The damper according to claim 15, wherein
the outer circumference of the piston has a circular shape, and
the cutout portion has a shape obtained by cutting a part of the circular shape with one plane when the piston is viewed axially.

17. The damper according to claim 15, wherein
the cutout portion extends so as to penetrate the convex portion in an axial direction, and
during the braking of the damper, the entire circumference of at least a part of the piston in the axial direction comes in pressure contact with the inner circumference of the cylinder due to the axial compression force, while the cutout portion formed in the convex portion is configured not to come in close contact with the inner circumference of the cylinder.

18. The damper according to claim 15, wherein
the cutout portion is not formed in the convex portion, and
during the braking of the damper, the entire circumference of the convex portion comes in pressure contact with the inner circumference of the cylinder, while a portion where the cutout portion is provided is configured not to come in close contact with the inner circumference of the cylinder and configured to form a gap with the inner circumference.

19. The damper according to claim 3, wherein
the piston includes a cutout portion on an outer circumference thereof, and
the cutout portion is formed at least partway from one end to the other end side or formed at least partway from the other end to one end side.

20. The damper according to claim 19, wherein
the outer circumference of the piston has a circular shape, and
the cutout portion has a shape obtained by cutting a part of the circular shape with one plane when the piston is viewed axially.

* * * * *